United States Patent
Sasaki et al.

(10) Patent No.: US 11,929,865 B2
(45) Date of Patent: Mar. 12, 2024

(54) SIGNAL MODULATION APPARATUS AND SIGNAL MODULATION METHOD

(71) Applicant: NEC Corporation, Tokyo (JP)

(72) Inventors: Eisaku Sasaki, Tokyo (JP); Xinyue Liu, London (GB); Izzat Darwazeh, London (GB); Nader Zein, Heidelberg (GE)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/834,162

(22) Filed: Jun. 7, 2022

(65) Prior Publication Data

US 2022/0417075 A1    Dec. 29, 2022

(30) Foreign Application Priority Data

Jun. 24, 2021    (JP) .................................. 2021-105088

(51) Int. Cl.
*H04L 27/36*    (2006.01)
(52) U.S. Cl.
CPC ................................... *H04L 27/36* (2013.01)
(58) Field of Classification Search
CPC . H04L 27/36; H04L 27/3405; H04L 27/3488; H04B 10/5161
See application file for complete search history.

(56) References Cited

U.S. PATENT DOCUMENTS

| | | | | |
|---|---|---|---|---|
| 5,243,627 A | * | 9/1993 | Betts | H04L 27/3416 714/795 |
| 5,258,987 A | * | 11/1993 | Wei | H04L 27/3433 714/792 |
| 10,601,517 B1 | * | 3/2020 | Kim | H03M 13/6522 |
| 11,277,206 B1 | * | 3/2022 | Oveis Gharan | H04B 10/5161 |

OTHER PUBLICATIONS

A. Gershoand, V. B. Lawrence, "Multidimensional Signal Constellations for Voiceband Data Transmission," IEEE Journal on selected areas in communications, vol. sac-2, No. 5, Sep. 1984.
M. Stark, F. Ait Aoudia and J. Hoydis, "Joint Learning of Geometric and Probabilistic Constellation Shaping," 2019 IEEE Globecom Workshops (GC Wkshps), Waikoloa, HI, USA, 2019, pp. 1-6.
K. Zeger A. Gersho, "Pseudo-gray coding," IEEE Transactions on Communications, vol. 38, No. 12, pp. 2147-2158, Dec. 1990.
R. Battiti and G. Tecchiolli, "The reactive tabu search," ORSA journal on computing, vol. 6, No. 2, pp. 126-140, 1994.

* cited by examiner

*Primary Examiner* — Sophia Vlahos
(74) *Attorney, Agent, or Firm* — Michael Dryja

(57) ABSTRACT

Provided is a signal modulation apparatus configured to modulate an input signal into a multidimensional QAM signal using multidimensional QAM, in which Multidimensional QAM is QAM in which two-dimensional QAM is configured in a multidimensional manner using a plurality of consecutive time slots, a constellation for multidimensional QAM is part of a combination of a constellation of first two-dimensional QAM, and a constellation of second two-dimensional QAM.

11 Claims, 22 Drawing Sheets

Fig. 5

| REFERENCE SIGNAL | CANDIDATE SIGNAL | |
|---|---|---|
| (1, 1, 1, 1) | (-1, -1, -1, -1)<br>(-1, -1, 1, -1)<br>(-1, 1, -1, -1)<br>(-1, 1, 1, -1)<br>( 1, -1, -1, -1)<br>( 1, -1, 1, -1)<br>( 1, 1, -1, -1)<br>( 1, 1, 1, -1) | (-1, -1, -1, 1)<br>(-1, -1, 1, 1)<br>(-1, 1, -1, 1)<br>(-1, 1, 1, 1)<br>( 1, -1, -1, 1)<br>( 1, -1, 1, 1)<br>( 1, 1, -1, 1)<br>( 1, 1, 1, 1) |
| (2, 0, 0, 0) | ( 0, 0, 0, 2)<br>( 0, 2, 0, 0)<br>( 0, 0, 0, -2)<br>( 0, -2, 0, 0) | ( 0, 0, 2, 0)<br>( 2, 0, 0, 0)<br>( 0, 0, -2, 0)<br>(-2, 0, 0, 0) |

● : SIGNAL POINTS OF CONSTELLATION OF 2D-32-QAM
△ : SIGNAL POINTS OF CONSTELLATION OF 2D-25-QAM

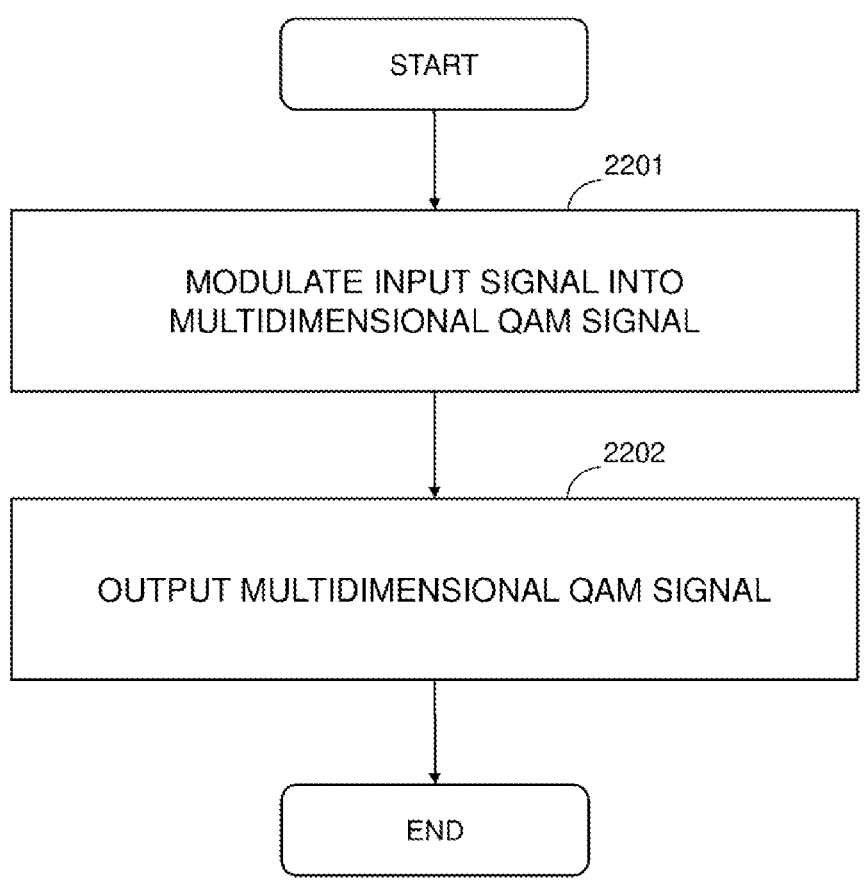

SIGNAL MODULATION APPARATUS AND SIGNAL MODULATION METHOD

CROSS-REFERENCES TO RELATED APPLICATION

The present application claims priority to Japanese patent application No. JP 2021-105088 filed on Jun. 24, 2021, the content of which is hereby incorporated by reference in its entirety.

BACKGROUND

Technical Field

The present disclosure relates to a signal modulation apparatus and a signal modulation method.

Background Art

In the field of radio communication, for example, in order to respectively assign a plurality of bit sequences to a plurality of signal symbols, a multilevel modulation scheme is used. One example of the multilevel modulation scheme is quadrature amplitude modulation (QAM).

QAM is a modulation scheme in which data is transmitted by adjusting (changing) amplitude and phase of two carrier waves (an in-phase carrier wave and a quadrature-phase carrier wave) that are independent of each other. In QAM, signal symbols representing a bit sequence are assigned to a two-dimensional plane. The two-dimensional plane has an in-phase axis (I axis) and a quadrature axis (Q axis) that are orthogonal to each other, and is hereinafter referred to as an "IQ plane". The signal symbols are transmitted using one time slot. This QAM is referred to as "2D-QAM (or two-dimensional QAM)" so as to be distinguished from other QAM to be described later.

NPL 1 discloses QAM in which 2D-QAM is configured in a four-dimensional manner using two time slots. This QAM is hereinafter referred to as "4D-QAM (or four-dimensional QAM)". Note that NPL 1 is incorporated herein by reference in its entirety.

[NPL 1] A. Gershoand, V. B. Lawrence, "Multidimensional Signal Constellations for Voiceband Data Transmission," IEEE Journal on selected areas in communications, vol. sac-2, no.5, Sep. 1984.
[NPL 2] M. Stark, F. Ait Aoudia and J. Hoydis, "Joint Learning of Geometric and Probabilistic Constellation Shaping," 2019 IEEE Globecom Workshops (GC Wkshps), Waikoloa, HI, USA, 2019, pp. 1-6
[NPL 3] K. Zeger and A. Gersho, "Pseudo-gray coding," IEEE Transactions on Communications, vol. 38, no. 12, pp. 2147-2158, 1990.
[NPL 4] R. Battiti and G. Tecchiolli, "The reactive tabu search," ORSA journal on computing, vol. 6, no. 2, pp. 126-140, 1994.

SUMMARY

In recent years, ultra-multilevel QAM such as 1024-QAM and 4096-QAM has been put into practice. Against increase of a carrier to noise power ratio (CNR) caused due to such an increase of levels, forward error correction (FEC) having high correction capability is applied. Examples of codes used for such FEC include low-density parity check (LDPC) codes. However, in order to implement the LDPC codes, a circuit having a relatively large scale is required. As a result, costs and power consumption are increased.

The present disclosure provides an apparatus and a method capable of reducing costs and power consumption in ultra-multilevel QAM.

In one or more example embodiments, there is provided a signal modulation apparatus including a memory configured to store an instruction, and at least one processor configured to execute the instruction to modulate an input signal into a multidimensional QAM signal using multidimensional QAM. The multidimensional QAM is QAM in which two-dimensional M-QAM is configured in a multidimensional manner using a plurality of consecutive time slots. The two-dimensional M-QAM is QAM in which signal points of signal symbols representing a bit sequence are assigned to a two-dimensional plane with an in-phase axis and a quadrature axis. M is an even power of 2 and is equal to or greater than 64. A constellation for the multidimensional QAM is part of a combination of a first constellation and a second constellation. The first constellation is a constellation of the two-dimensional M-QAM. The second constellation is a constellation of following two-dimensional QAM.

$(\sqrt{M}-1)^2$–QAM

In one or more example embodiments, there is provided a signal modulation apparatus including a memory configured to store an instruction, and at least one processor configured to execute the instruction to modulate an input signal into a multidimensional QAM signal using multidimensional QAM. The multidimensional QAM is QAM in which two-dimensional N-QAM is configured in a multidimensional manner using a plurality of consecutive time slots. The two-dimensional N-QAM is QAM in which signal points of signal symbols representing a bit sequence are assigned to a two-dimensional plane with an in-phase axis and a quadrature axis. N is an odd power of 2 and is equal to or greater than 32. A constellation for the multidimensional QAM is part of a combination of a first constellation and a second constellation. The first constellation is a constellation of the two-dimensional N-QAM. The second constellation is a constellation of following two-dimensional QAM.

$$\left(\sqrt{\frac{N}{2}}+1\right)^2 - QAM$$

In one or more example embodiments, there is provided a signal modulation method including modulating an input signal into a multidimensional QAM signal using multidimensional QAM, and outputting the multidimensional QAM signal. The multidimensional QAM is QAM in which two-dimensional M-QAM is configured in a multidimensional manner using a plurality of consecutive time slots. The two-dimensional M-QAM is QAM in which signal points of signal symbols representing a bit sequence are assigned to a two-dimensional plane with an in-phase axis and a quadrature axis. M is an even power of 2 and is equal to or greater than 64. A constellation for the multidimensional QAM is part of a combination of a first constellation and a second constellation. The first constellation is a constellation of the two-dimensional M-QAM. The second constellation is a constellation of following two-dimensional QAM.

$(\sqrt{M}-1)^2$–QAM

In one or more example embodiments, there is provided a signal modulation method including modulating an input signal into a multidimensional QAM signal using multidimensional QAM, and outputting the multidimensional QAM signal. The multidimensional QAM is QAM in which two-dimensional N-QAM is configured in a multidimensional manner using a plurality of consecutive time slots. The two-dimensional N-QAM is QAM in which signal points of signal symbols representing a bit sequence are assigned to a two-dimensional plane with an in-phase axis and a quadrature axis. N is an odd power of 2 and is equal to or greater than 32. A constellation for the multidimensional QAM is part of a combination of a first constellation and a second constellation. The first constellation is a constellation of the two-dimensional N-QAM. The second constellation is a constellation of following two-dimensional QAM.

$$\left(\sqrt{\frac{N}{2}}+1\right)^2 - QAM$$

According to the configuration described above, costs and power consumption can be reduced in ultra-multilevel QAM. Issues, configurations, and effects other than those described above become apparent in the following description of the example embodiments.

BRIEF DESCRIPTION OF THE DRAWINGS

FIG. 5 is an example in which candidate signals are obtained from reference signals;

FIG. 22 is a flowchart for illustrating an example of a flow of processing of the signal modulation apparatus according to the second example embodiment.

DESCRIPTION OF THE EXAMPLE EMBODIMENTS

In the following, one or more example embodiments will be described with reference to the accompanying drawings. Note that, in the Specification and drawings, elements to which similar descriptions are applicable are denoted by the same reference signs, and overlapping descriptions are hence omitted.

Descriptions will be given in the following order.
1. Related Techniques of Example Embodiments
2. Overview of Example Embodiments
3. First Example Embodiment
3-1. Configuration of System
3-2. Configuration of Base Station
3-3. Configuration of Terminal Apparatus
3-4. Configuration of Calculation Apparatus
3-5. Configuration of Constellation
3-6. Flow of Processing
3-7. Effects
3-8. Generalization of Configuration of Constellation
3-9. Example Alterations
4. Second Example Embodiment
4-1. Configuration of Signal Modulation Apparatus
4-2. Flow of Processing 1. Related Techniques of Example Embodiments With reference to FIG. 1 to FIG. 5, as related techniques of example embodiments to be described later, 2D-QAM and 4D-QAM will be described. In the following, as an example of 2D-QAM, 2D-16-QAM will be described. Furthermore, as an example of 4D-QAM, 4D-256-QAM will be described.

(1) 2D-16-QAM

Figure 1:
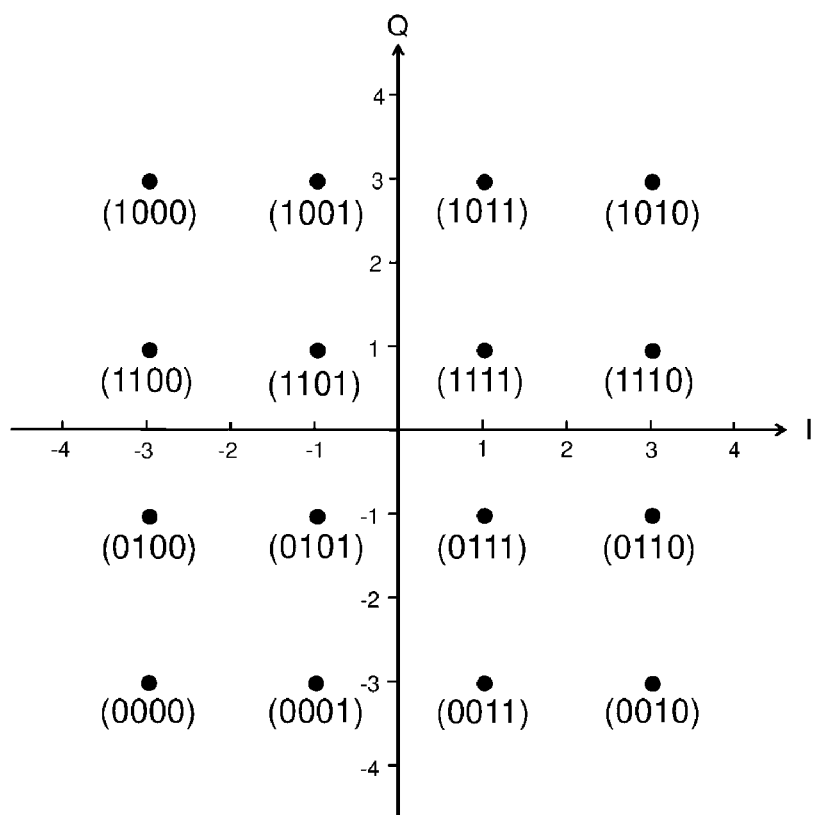
FIG. 1 is an example of a constellation (signal point constellation diagram) of 2D-16-QAM.

FIG. 1 is a constellation (signal point constellation diagram) of 2D-16-QAM. In 16-QAM, signal points of signal symbols representing a bit sequence (4 bits) are assigned on an IQ plane (two-dimensional plane) with an I axis and a Q axis. The signal points of signal symbols are laid out in a square lattice manner. In general, an I coordinate and a Q coordinate of a signal point is each represented by an odd number so that a minimum distance between signal points is "2". In other words, signal points of signal symbols are laid out on odd-numbered lattice points in the IQ plane.

As illustrated in FIG. 1, the distance between signal points adjacent to each other along the I axis (or the Q axis) is "2", and accordingly a decision error of signals is liable to occur between signal symbols corresponding to these signal points. In contrast, the distance between signal points adjacent in an oblique direction is larger than "2", and accordingly a decision error of signals is not liable to occur between signal symbols corresponding to these signal points. In this manner, probability of occurrence of a decision error of signals is not uniform on the IQ plane. This is also said that "signal point density is low".

(2) 4D-256-QAM

As one technique of enhancing signal point density, a multidimensional modulation scheme is known. The multidimensional modulation scheme can reduce average power of modulated signals by enhancing signal point density. One example of the multidimensional modulation scheme is multidimensional QAM. Multidimensional QAM is QAM in which 2D-QAM is configured in a multidimensional manner using a plurality of time slots.

Figure 2:
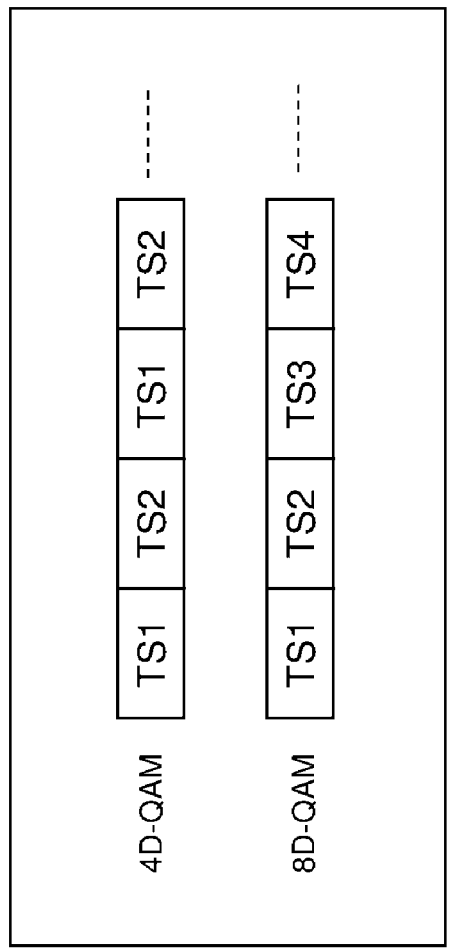
FIG. 2 is a diagram illustrating a plurality of time slots used in multidimensional QAM.

FIG. 2 is a diagram illustrating a plurality of time slots used in multidimensional QAM. In 4D-QAM, 2D-QAM is configured in a multidimensional manner using two consecutive time slots (TS1 and TS2). In eight-dimensional QAM (8D-QAM), 2D-QAM is configured in a multidimensional manner using four consecutive time slots (TS1 to TS4). In this manner, $(2 \times N_{TS})$-dimensional QAM can be implemented. Here, $N_{TS}$ is the number of consecutive time slots.

Note that, even when 2D-QAM is configured in a multidimensional manner, the data amount (number of bits) that can be transmitted per time slot does not change. Accordingly, frequency utilization efficiency (bps/Hz) of multidimensional QAM is the same as that of 2D-QAM.

Next, 4D-256-QAM will be described. The first time slot used in 4D-QAM is hereinafter referred to as "TS1", and the second time slot following the first time slot is hereinafter referred to as "TS2".

For 4D-QAM, a constellation (signal point constellation diagram) is defined. The constellation for 4D-QAM is a combination of signal points used in TS1 and signal points used in TS2. Accordingly, one constellation (in other words, the same constellation) is used in each of TS1 and TS2. The constellation for 4D-QAM is hereinafter referred to as a "4D-constellation".

Figure 3:
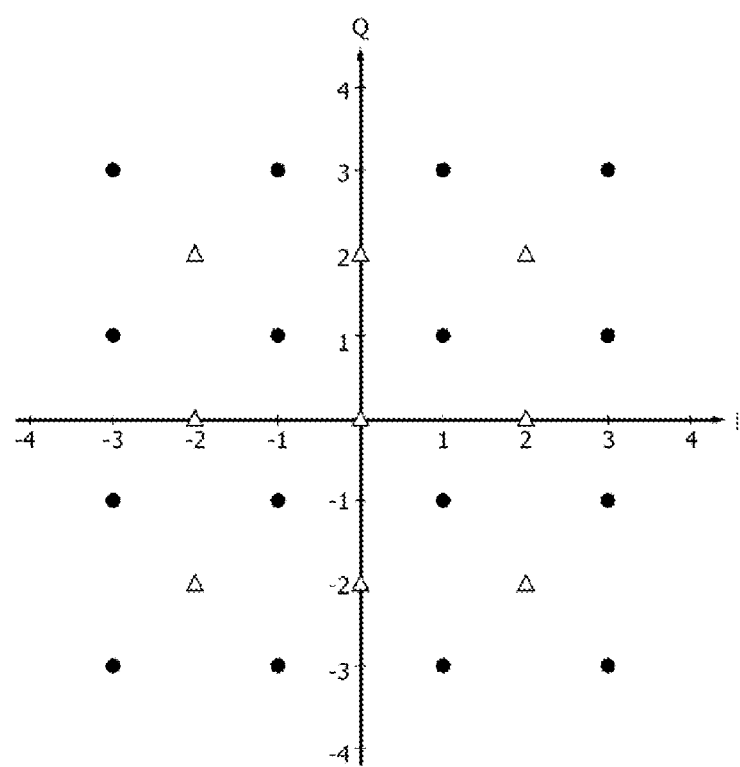
FIG. 3 is an example of a constellation for 4D-256-QAM.

NPL 1 discloses 4D-256-QAM in which 2D-16-QAM is configured in a four-dimensional manner using two time slots. FIG. 3 is an example of the 4D-constellation for 4D-256-QAM. The 4D-constellation is a combination of constellations of two 2D-QAMs. Specifically, the 4D-constellation is a combination of a constellation of 2D-16-QAM and a constellation of 2D-9-QAM.

In FIG. 3, circle points (16 points) denote signal points of the constellation of 2D-16-QAM. The signal points of the constellation of 2D-16-QAM are present on odd-numbered lattice points in the IQ plane. Triangle points (9 points) denote signal points of the constellation of 2D-9-QAM. The signal points of the constellation of 2D-9-QAM are present on even-numbered lattice points in the IQ plane. Note that one of the signal points of the constellation of 2D-9-QAM is present at the origin (0, 0). Accordingly, the 4D-constellation has 25 signal points. The 4D-constellation is used in each of TS1 and TS2.

One of the two constellations of 2D-QAMs adopted as the 4D-constellation is hereinafter referred to as a "first constellation", and the other is hereinafter referred to as a "second constellation". In the present example, the first constellation is the constellation of 2D-16-QAM, and the second constellation is the constellation of 2D-9-QAM.

The I coordinate of a signal point of the 4D-constellation in TS1 is represented by "$I_1$", and the Q coordinate thereof is represented by "$Q_1$". Accordingly, the coordinates of a signal point of the 4D-constellation in TS1 are expressed as $(I_1, Q_1)$.

The I coordinate of a signal point of the 4D-constellation in TS2 is represented by "$I_2$", and the Q coordinate thereof is represented by "$Q_2$". Accordingly, the coordinates of a signal point of the 4D-constellation in TS2 are expressed as $(I_2, Q_2)$.

A multidimensional QAM signal (in this example, a four-dimensional QAM signal) is expressed by a combination of coordinates $(I_1, Q_1)$ of a signal point of the 4D-constellation in TS1 and coordinates $(I_2, Q_2)$ of a signal point of the 4D-constellation in TS2. In the present example, a four-dimensional QAM signal is a column vector including four coordinate values, and is expressed as $(I_1, Q_1, I_2, Q_2)$.

In the present example, from the viewpoint of maintaining the minimum distance between four-dimensional QAM signals on the four-dimensional space expressed using TS1 and TS2 to "2", the four-dimensional QAM signals are limited to a first signal and a second signal described below.

First signal: A signal point with $(I_1, Q_1)$ of the first constellation and a signal point with $(I_2, Q_2)$ of the first constellation. In other words, the first signal is a signal defined by a combination of a signal point of the first constellation in TS1 and a signal point of the first constellation in TS2.

Second signal: A signal point with $(I_1, Q_1)$ of the second constellation and a signal point with $(I_2, Q_2)$ of the second constellation. In other words, the second signal is a signal defined by a combination of a signal point of the second constellation in TS1 and a signal point of the second constellation in TS2.

Note that, when the coordinates of the two four-dimensional QAM signals are defined as $(I_{1a}, Q_{1a}, I_{2a}, Q_{2a})$ and $(I_{1b}, Q_{1b}, I_{2b}, Q_{2b})$, a distance $d_4$ between the four-dimensional QAM signals is defined by the following equation.

$$d_4 = \sqrt{(I_{1a} - I_{1b})^2 + (Q_{1a} - Q_{1b})^2 + (I_{2a} - I_{2b})^2 + (Q_{2a} - Q_{2b})^2}$$

According to the configuration, the minimum distance between signals in 2D-QAM and the minimum distance between signals in 4D-QAM are the same. In other words, even when 2D-QAM is configured in a four-dimensional manner, the minimum distance between signals is maintained. This means that the relationship of distances with respect to the same noise amount is the same. In addition to this, because signal point density can be enhanced by configuring 2D-QAM in a four-dimensional manner, average power is reduced.

As an example, the four-dimensional QAM signal may be determined in the following procedure. First, a plurality of candidate signals for determining the four-dimensional QAM signals are determined. The plurality of candidate signals are determined based on a plurality of reference signals. The reference signals are determined based on a signal as a start point (start point signal). In the present example, the start point signal is at (1, 1, 1, 1). Note that the start point signal may be at other coordinates.

Figure 4:
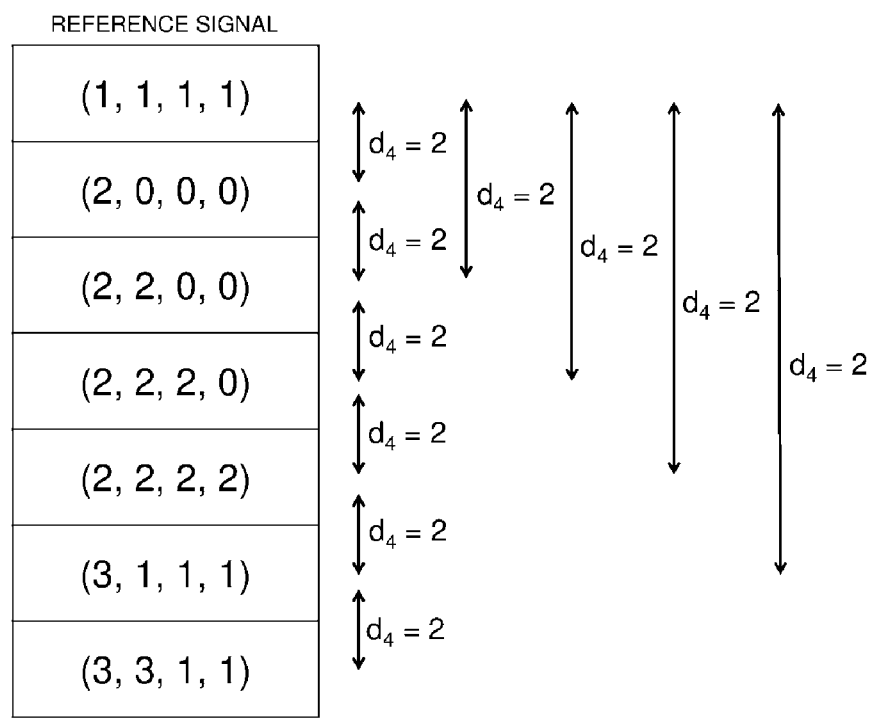
FIG. 4 is an example of a plurality of reference signals for determining a plurality of candidate signals for four-dimensional QAM signals.

The plurality of reference signals include the start point signal, a first set being a set of signals each of whose distances $d_4$ from the start point signal is "2", . . . , and an i-th set being a set of signals each of whose distances $d_4$ from an element of an (i-1)-th set is "2". Note that i is an integer of 2 or greater.

i is set so that the number of candidate signals to be ultimately obtained is 256 or greater. In the present example, i is "2". FIG. 4 is an example of the reference signals. As illustrated in FIG. 4, the reference signals include seven signals. The reference signals include (1, 1, 1, 1), a first set of signals each of whose distances $d_4$ from (1, 1, 1, 1) is "2", and a second set of signals each of whose distances $d_4$ from an element of the first set is "2".

In addition, the reference signals include a set of first signals and a set of second signals. As illustrated in FIG. 4, the set of first signals includes (1, 1, 1, 1), (3, 1, 1, 1), and (3, 3, 1, 1). The set of second signals includes (2, 0, 0, 0), (2, 2, 0, 0), (2, 2, 2, 0), and (2, 2, 2, 2).

Next, the plurality of candidate signals are obtained by inverting the sign of the coordinates and rearranging the order of the coordinates regarding each of the plurality of reference signals. FIG. 5 illustrates an example in which candidate signals are obtained from reference signals. For example, as illustrated in FIG. 5, 16 candidate signals are obtained from a reference signal (1, 1, 1, 1). Similarly, 8 candidate signals are obtained from a reference signal (2, 0, 0, 0).

256 four-dimensional QAM signals are selected from a plurality of candidate signals in ascending order of amplitude from one having the smallest amplitude. As a result, the 4D-constellation illustrated in FIG. 3 is obtained. According to the configuration, by enhancing signal point density, average power of modulated signals (QAM signals) can be reduced. For example, the four-dimensional QAM signals are determined so that the amplitude at signal points in TS2 is small even if the amplitude at signal points in TS1 is large. Accordingly, average power of the four-dimensional QAM signals is reduced. The average power in 4D-256-QAM is reduced from that of 2D-16-QAM by approximately 1.5 dB. This effect of reducing the average power is higher as a number representing dimension is higher.

<<2. Overview of Example Embodiments>>

An overview of one or more example embodiments to be described later will be described.

(1) Technical Issues

NPL 1 discloses the technique related to 4D-256-QAM, but does not disclose a technique for implementing ultra-multilevel QAM by any means. As described above, in regards to ultra-multilevel QAM, a configuration that enables reduction of costs and power consumption is required.

(2) Technical Features

In one or more example embodiments, a signal modulation apparatus is provided. The signal modulation apparatus is an apparatus that implements ultra-multilevel QAM. The signal modulation apparatus includes a signal modulator configured to modulate an input signal into a multidimensional QAM signal using multidimensional QAM. Multidimensional QAM is QAM in which two-dimensional M-QAM is configured in a multidimensional manner using a plurality of consecutive time slots. Two-dimensional M-QAM is QAM in which signal points of signal symbols representing a bit sequence are assigned to a two-dimensional plane (IQ plane) with an in-phase axis (I axis) and a quadrature axis (Q axis). M is an even power of 2 and is equal to or greater than 64.

For example, multidimensional QAM may be four-dimensional QAM in which two-dimensional M-QAM is configured in a multidimensional manner using two consecutive time slots. Note that multidimensional QAM may be multidimensional QAM other than four-dimensional QAM.

A constellation for multidimensional QAM is part of a combination of a first constellation and a second constellation. The constellation for multidimensional QAM is used in each of a plurality of time slots.

The first constellation is a constellation of two-dimensional M-QAM.

The second constellation is a constellation of following two-dimensional QAM.

$$(\sqrt{M}-1)^2\text{-QAM}$$

In one or more example embodiments, a signal modulation apparatus is provided. The signal modulation apparatus is an apparatus that implements ultra-multilevel QAM. The signal modulation apparatus includes a signal modulator configured to modulate an input signal into a multidimensional QAM signal using multidimensional QAM. Multidimensional QAM is QAM in which two-dimensional N-QAM is configured in a multidimensional manner using a plurality of consecutive time slots. Two-dimensional N-QAM is QAM in which signal points of signal symbols representing a bit sequence are assigned to a two-dimensional plane (IQ plane) with an in-phase axis (I axis) and a quadrature axis (Q axis). N is an odd power of 2 and is equal to or greater than 32.

For example, multidimensional QAM may be four-dimensional QAM in which two-dimensional N-QAM is configured in a multidimensional manner using two consecutive time slots. Note that multidimensional QAM may be multidimensional QAM other than four-dimensional QAM.

A constellation for multidimensional QAM is part of a combination of a first constellation and a second constellation. The constellation for multidimensional QAM is used in each of a plurality of time slots.

The first constellation is a constellation of two-dimensional N-QAM.

The second constellation is a constellation of following two-dimensional QAM.

$$\left(\sqrt{\frac{N}{2}}+1\right)^2\text{-QAM}$$

According to the above configuration, costs and power consumption can be reduced in ultra-multilevel QAM.

<<3. First Example Embodiment>>

Next, with reference to FIG. 6 to FIG. 17, a first example embodiment will be described.

<3-1. Configuration of System>

Figure 6:
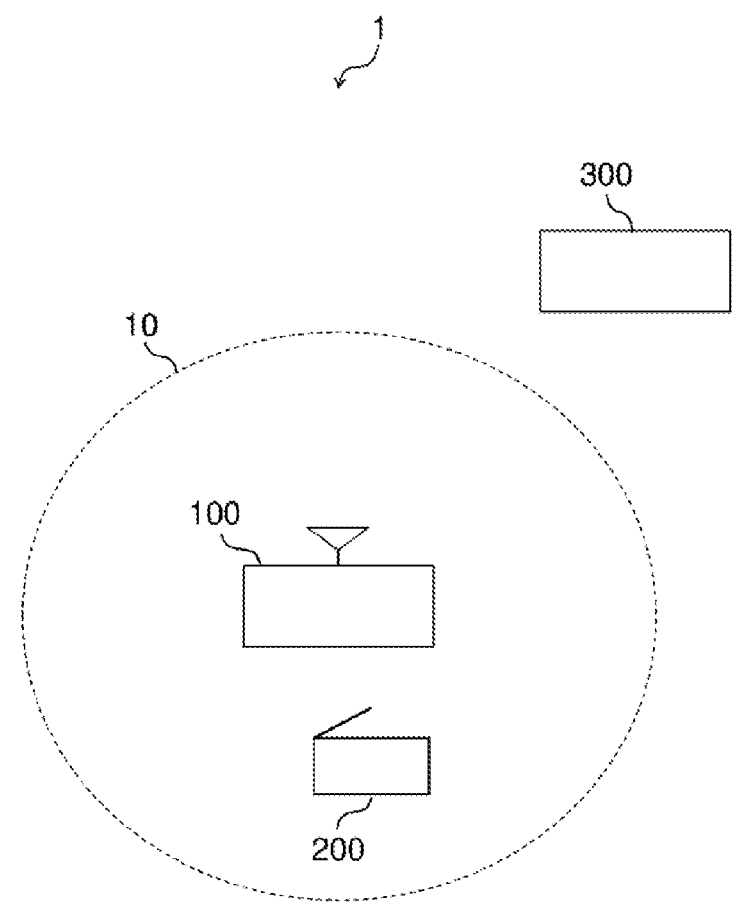
FIG. 6 is a diagram illustrating an example of a configuration of a system according to a first example embodiment.

FIG. 6 is a diagram illustrating an example of a configuration of a system 1. The system 1 includes a base station 100, a terminal apparatus 200, and a calculation apparatus 300.

The base station 100 and the terminal apparatus 200 constitute a radio communication system. The radio communication system is a system in conformity to 3GPP. Specifically, the radio communication system may be a system in conformity to the standard of 5G. As a matter of course, the radio communication system is not limited to this example.

The base station 100 is a node that performs radio communication with the terminal apparatus 200 located in a cell 10 (or a coverage area 10). In other words, the base station 100 is a node of a radio access network (RAN).

The terminal apparatus 200 performs radio communication with the base station 100 when the terminal apparatus 200 is located in the cell 10. The terminal apparatus 200 may be referred to as a user equipment (UE), a mobile station, or the like. The terminal apparatus 200 is a mobile terminal, such as a smartphone, a mobile phone, or a tablet.

The calculation apparatus 300 is an apparatus that calculates data (4D-constellation and the like) used in the base station 100 and the terminal apparatus 200. The calculation apparatus 300 may be a general-purpose computer. The data calculated by the calculation apparatus 300 may be provided to the base station 100 and the terminal apparatus 200 via a storage medium or a network.

<3-2. Configuration of Base Station>

Figure 7:
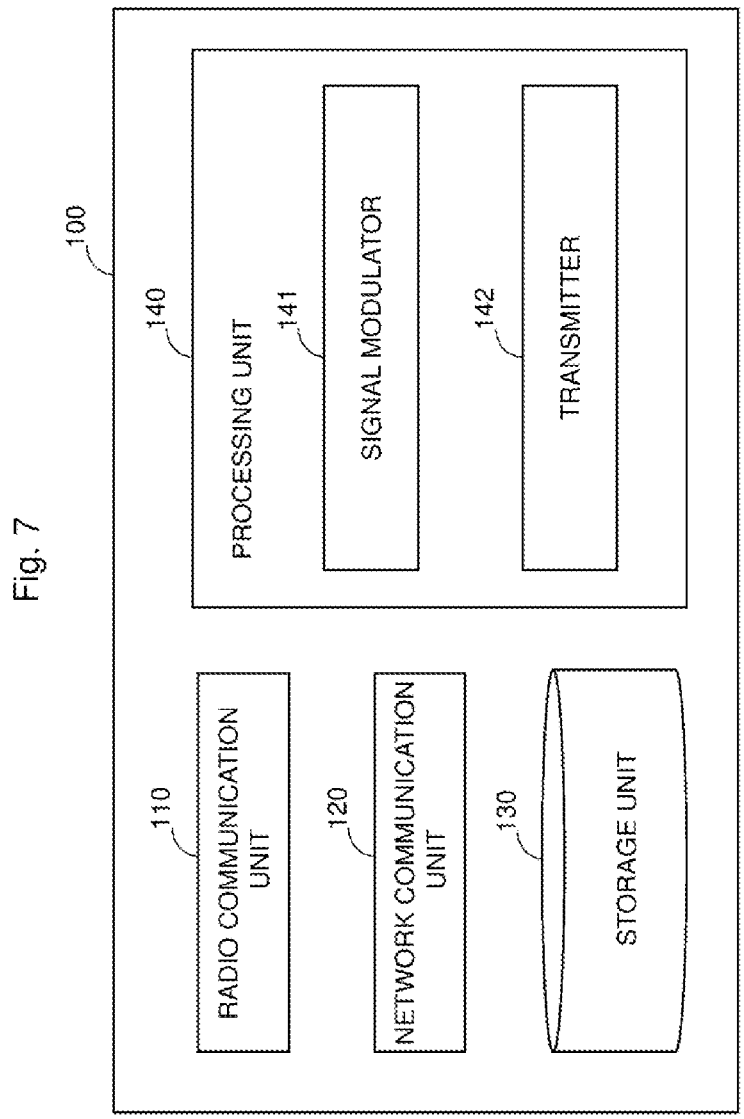
FIG. 7 is a block diagram illustrating a configuration of a base station according to the first example embodiment.

Next, with reference to FIG. 7, a configuration of the base station 100 will be described. FIG. 7 is a block diagram illustrating an example of a configuration of the base station 100. The base station 100 includes a radio communication unit 110, a network communication unit 120, a storage unit 130, and a processing unit 140.

The radio communication unit 110 includes an antenna for radio communication. The radio communication unit 110 transmits a signal to the terminal apparatus 200 via the antenna, and receives a signal from the terminal apparatus 200 via the antenna.

The network communication unit 120 transmits a signal to a node (not illustrated) of a core network, and receives a signal from the node of the core network.

The storage unit 130 includes a volatile memory and a non-volatile memory. The volatile memory may include, for example, a random access memory (RAM). The non-volatile memory may include, for example, one or more of a read only memory (ROM), a hard disk drive (HDD), and a solid state drive (SSD). The non-volatile memory stores a program code (instructions) for implementing various functions of the base station 100.

In addition, the non-volatile memory stores information (data) used in operation of the processing unit 140. The non-volatile memory stores a 4D-constellation and mapping information. The mapping information is information defining correspondence between a four-dimensional QAM signal ($I_1$, $Q_1$, $I_2$, $Q_2$) and a bit sequence corresponding to the four-dimensional QAM signal. "The 4D-constellation and the mapping information" stored in the storage unit 130 are used in modulation processing in 4D-QAM, and are thus hereinafter collectively referred to as "modulation information".

The processing unit 140 includes one or more processors. The one or more processors may include, for example, one or more of a central processing unit (CPU), a micro processing unit (MPU), and a micro controller. The processing unit 140 implements various functions of the base station 100 by executing the program code (instructions) stored in the storage unit 130.

In the present example, the processing unit 140 functions as a signal modulator 141 and a transmitter 142. In other words, the signal modulator 141 and the transmitter 142 are functional modules implemented by the processing unit 140. Note that the processing unit 140 may further include other constituent elements in addition to these constituent elements.

The signal modulator 141 modulates an input signal into a four-dimensional QAM signal using four-dimensional QAM. QAM of the present example is 4D-4096-QAM. 4D-4096-QAM is QAM in which 2D-64-QAM is configured in a four-dimensional manner using two consecutive time slots (TS1 and TS2 ). 4D-4096-QAM has the same frequency utilization efficiency as that of 2D-64-QAM. Note that details of the 4D-constellation used in each of TS1 and TS2 will be described later.

The signal modulator 141 modulates an input signal into a four-dimensional QAM signal in accordance with the modulation information stored in the storage unit 130. As described above, the four-dimensional QAM signal is expressed by a combination of a signal point ($I_1$, $Q_1$) of the 4D-constellation in TS1 and a signal point ($I_2$, $Q_2$) of the 4D-constellation in TS2. The transmitter 142 transmits a modulated signal corresponding to the signal point ($I_1$, $Q_1$) to the terminal apparatus 200 via the radio communication unit 110 in TS1. Furthermore, the transmitter 142 transmits a modulated signal corresponding to the signal point ($I_2$, $Q_2$) to the terminal apparatus 200 via the radio communication unit 110 in TS2.

<3-3. Configuration of Terminal Apparatus>

Figure 8:
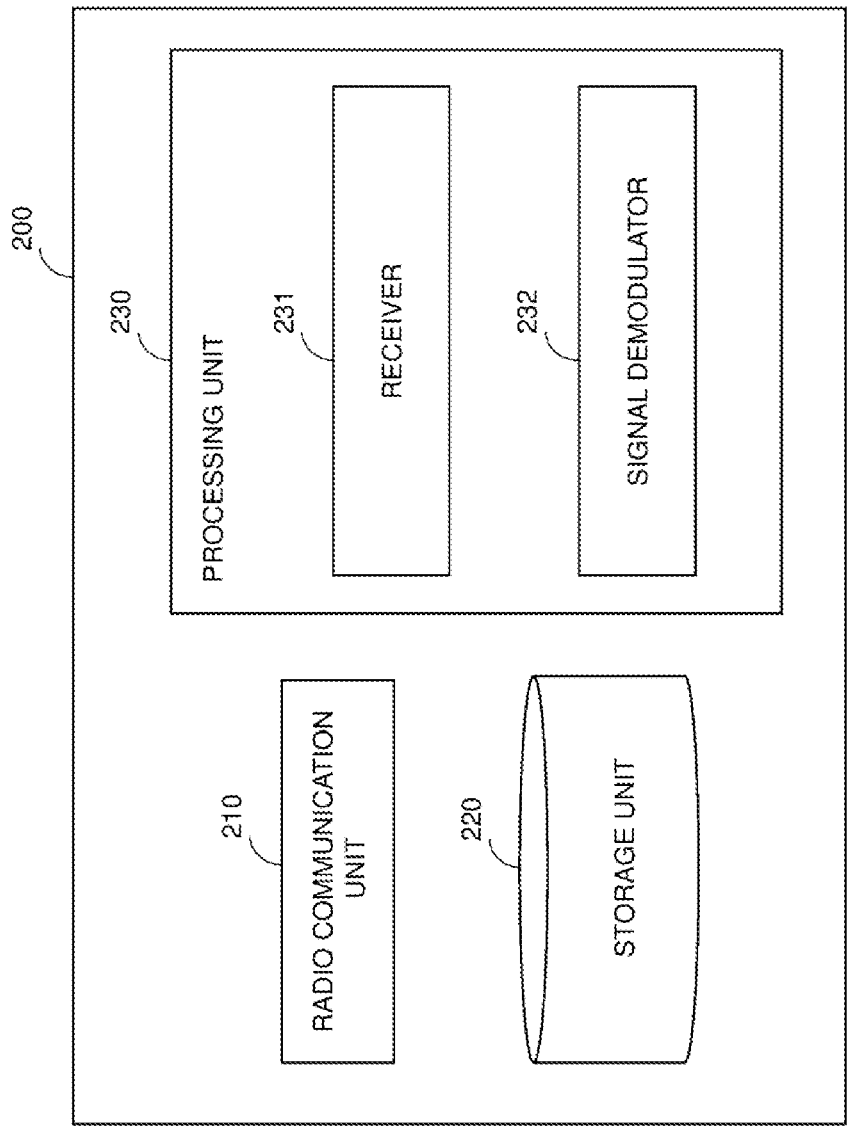
FIG. 8 is a block diagram illustrating a configuration of a terminal apparatus according to the first example embodiment.

Next, with reference to FIG. 8, a configuration of the terminal apparatus 200 will be described. FIG. 8 is a block diagram illustrating an example of a configuration of the terminal apparatus 200. The terminal apparatus 200 includes a radio communication unit 210, a storage unit 220, and a processing unit 230.

The radio communication unit 210 includes an antenna for radio communication. The radio communication unit 210 transmits a signal to the base station 100 via the antenna, and receives a signal from the base station 100.

The storage unit 220 includes a volatile memory and a non-volatile memory. The volatile memory may include, for example, a RAM. The non-volatile memory may include, for example, one or more of a ROM, an HDD, and an SSD. The non-volatile memory stores a program code (instructions) for implementing various functions of the terminal apparatus 200.

In addition, the non-volatile memory stores information (data) used in operation of the processing unit 230. The non-volatile memory stores a 4D-constellation and mapping information. "The 4D-constellation and the mapping information" stored in the storage unit 220 are used in demodulation processing in 4D-QAM, and are thus hereinafter collectively referred to as "demodulation information".

The processing unit 230 includes one or more processors. The one or more processors may include, for example, one or more of a CPU, an MPU, and a micro controller. The processing unit 230 implements various functions of the terminal apparatus 200 by executing the program code (instructions) stored in the storage unit 220.

In the present example, the processing unit 230 functions as a receiver 231 and a signal demodulator 232. In other words, the receiver 231 and the signal demodulator 232 are functional modules implemented by the processing unit 230. Note that the processing unit 230 may further include other constituent elements in addition to these constituent elements.

The receiver 231 receives a modulated signal from the base station 100 via the radio communication unit 210 in TS1. The receiver 231 receives a modulated signal from the base station 100 via the radio communication unit 210 in TS2. The signal demodulator 232 demodulates the modulated signals received in TS1 and TS2, in accordance with the demodulation information stored in the storage unit 220.

<3-4. Configuration of Calculation Apparatus>

Figure 9:
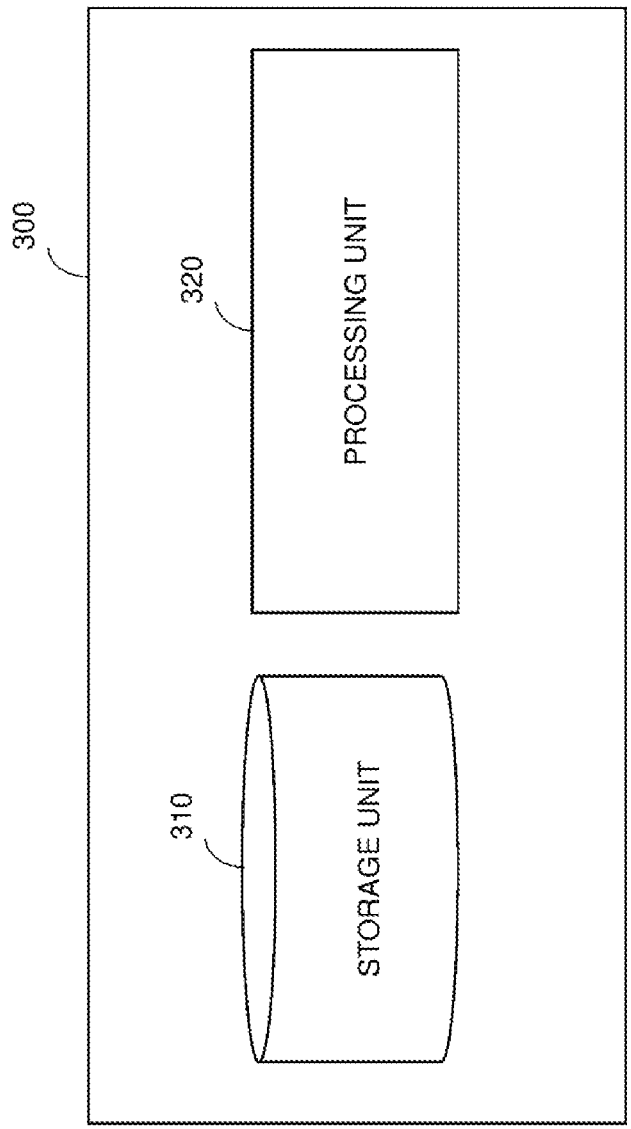
FIG. 9 is a block diagram illustrating a configuration of a calculation apparatus according to the first example embodiment.

Next, with reference to FIG. 9, a configuration of the calculation apparatus 300 will be described. FIG. 9 is a block diagram illustrating an example of a configuration of the calculation apparatus 300. The calculation apparatus 300 includes a storage unit 310 and a processing unit 320.

The storage unit 310 includes a volatile memory and a non-volatile memory. The volatile memory may include, for example, a RAM. The non-volatile memory may include, for example, one or more of a ROM, an HDD, and an SSD. The non-volatile memory stores a program code (instructions) for implementing various functions of the calculation apparatus 300.

The processing unit 320 includes one or more processors. The one or more processors may include, for example, one or more of a CPU, an MPU, and a micro controller. The processing unit 320 implements various functions of the calculation apparatus 300 by executing the program code (instructions) stored in the storage unit 310.

In the present example, the processing unit 320 calculates a 4D-constellation used in the base station 100 and the terminal apparatus 200. Note that the processing unit 320 may execute other calculation processing.

<3-5. Configuration of Constellation>

Figure 10:
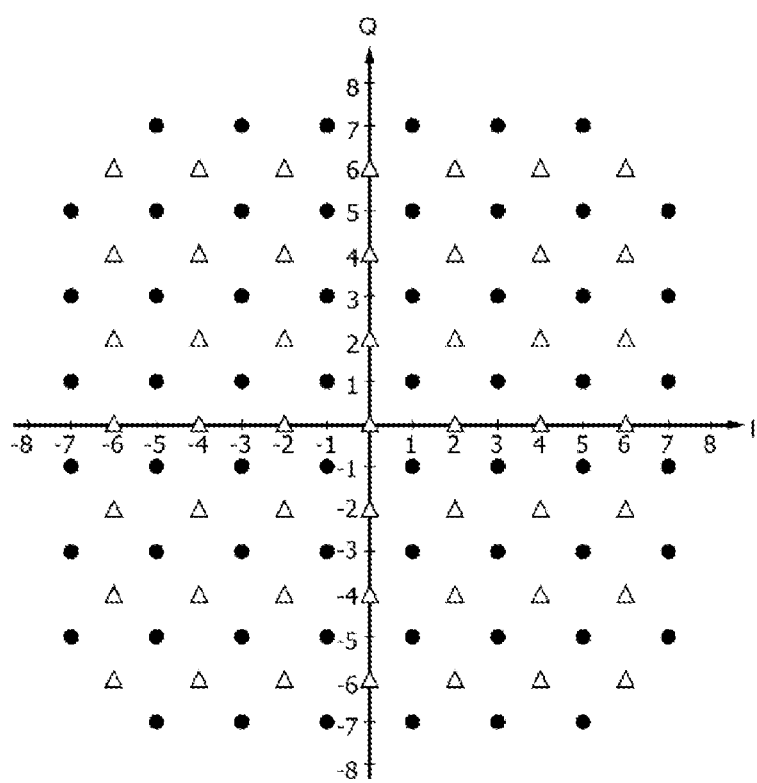
FIG. 10 is an example of a constellation for 4D-4096-QAM.

Next, with reference to FIG. 10, a 4D-constellation in the present example will be described. FIG. 10 is a 4D-constellation for 4D-4096-QAM.

The 4D-constellation is part of a combination of a constellation of 2D-64-QAM and a constellation of 2D-49-QAM. The constellation of 2D-64-QAM is hereinafter referred to as a "first constellation", and the constellation of 2D-49-QAM is hereinafter referred to as a "second constellation".

Signal points of the first constellation are present on odd-numbered lattice points in the IQ plane. Signal points of the second constellation are present on even-numbered lattice points in the IQ plane. Note that one of the signal points of the second constellation is present at the origin (0, 0).

In FIG. 10, circle points (60 signal points) denote a part of the signal points of the first constellation, and triangle points (49 signal points) denote the signal points of the second constellation. Accordingly, the 4D-constellation includes 109 signal points. Another part of the signal points of the first constellation (in other words, four signal points at four corners) are not selected. This means that four-dimensional QAM signals configured from those signal points are not selected from a plurality of candidate signals by reason of magnitude of amplitudes.

In this manner, the 4D-constellation is part of a combination of the first constellation and the second constellation. In other words, the 4D-constellation does not exceed the range of the combination of the first constellation and the second constellation. This is because of the following reason.

Regarding 4D-4096-QAM, a plurality of candidate signals for determining four-dimensional QAM signals are determined. Similarly to the above description, the plurality of candidate signals are determined based on a plurality of reference signals. Here, it is assumed that signals other than the combination of the first constellation and the second constellation are permitted as the candidate signals.

4096 four-dimensional QAM signals are selected from the plurality of candidate signals in ascending order of amplitude from one having the smallest amplitude. With the amplitude being taken into consideration, (8, 0, 0, 0) is selected. This four-dimensional QAM signal is a signal other than the combination of the first constellation and the second constellation.

Figure 11:
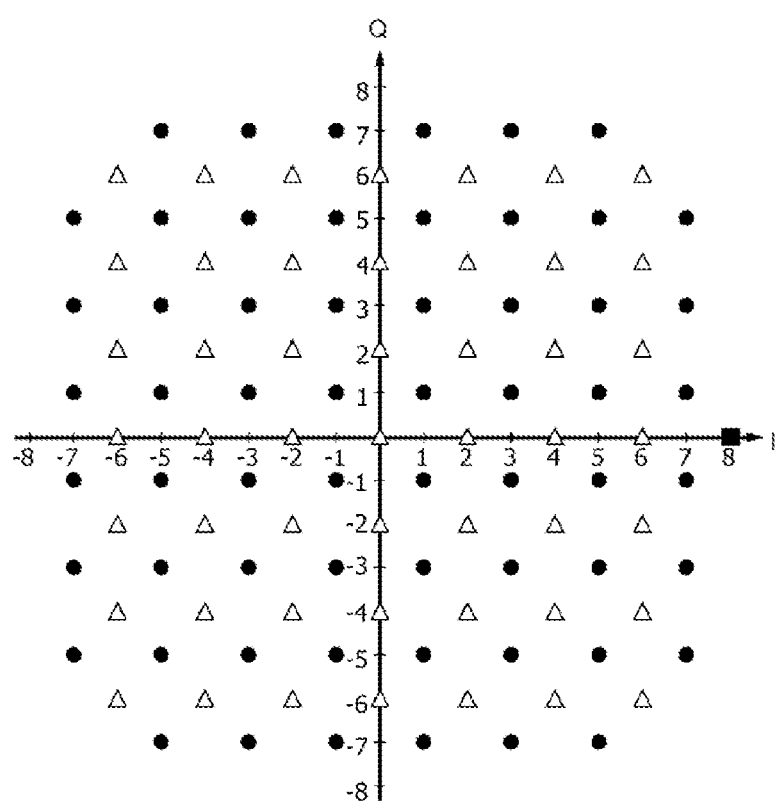
FIG. 11 is a constellation for four-dimensional QAM, which is a constellation when (8, 0, 0, 0) is included as a four-dimensional QAM signal.

FIG. 11 is a 4D-constellation of a case in which (8, 0, 0, 0) is included as the four-dimensional QAM signal. The 4D-constellation includes signal point coordinates (8, 0). Note that the coordinates (8, 0) are denoted by a square point. In this case, there are disadvantages as described below.

An apparatus (in the present example, the terminal apparatus 200) that receives the four-dimensional QAM signal divides the IQ plane into a plurality of areas, and determines in which area the signal point of the received modulated signal is present. With this, the terminal apparatus 200 can determine (identify) the signal symbol that has been received and with which signal point the signal symbol is associated.

Figure 12:
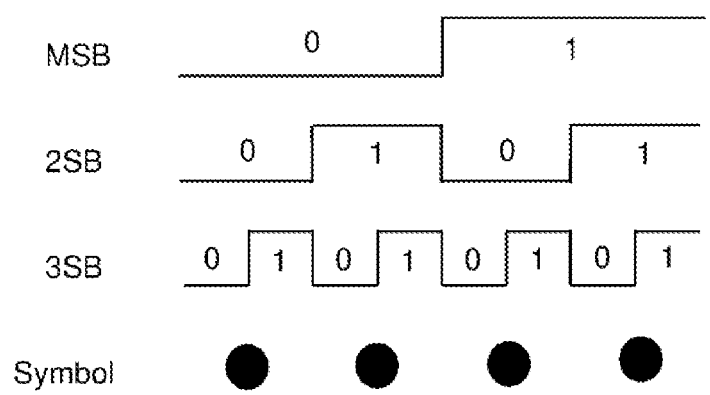
FIG. 12 is a diagram illustrating a relationship between positions of signal points and decision bits in a one-dimensional identification circuit of 16-QAM.

FIG. 12 is a diagram illustrating a relationship between positions of signal points and decision bits in a one-dimensional identification circuit of 16-QAM. The signal points are identified using two high-order bits (MSN and 2SB) (hard decision). One low-order bit (3SB) is an error signal. Regarding a shift of a position of a signal point or a shift of amplitude, the error signal indicates a direction of the shift.

When the number of one-dimensional signal points is an even power 2, the number of bits (hereinafter referred to as "hard decision bits") with which hard decision is performed is merely increased, and the fact that the low-order bit (one lower bit) with respect to the hard decision bits is an error signal does not change. In contrast, when the number of signal points slightly increases (for example, increases by 10%), even if the entire amplitude is reduced by 10%, the low-order bit (a bit positioned one bit lower) with respect to the hard decision bits is not an error signal. For example, when a total number of bits is 12 bits, it is necessary to perform decision on all of the 12 bits and generate an error signal of 1 bit. This configuration is considerably disadvantageous in implementation of the circuit. In view of this, the amplitude of a signal is significantly reduced so that an error signal of 1 bit is obtained. Then, an IQ plane on which a total number of signal points is doubled is used for decision of the received modulated signal.

Figure 13:
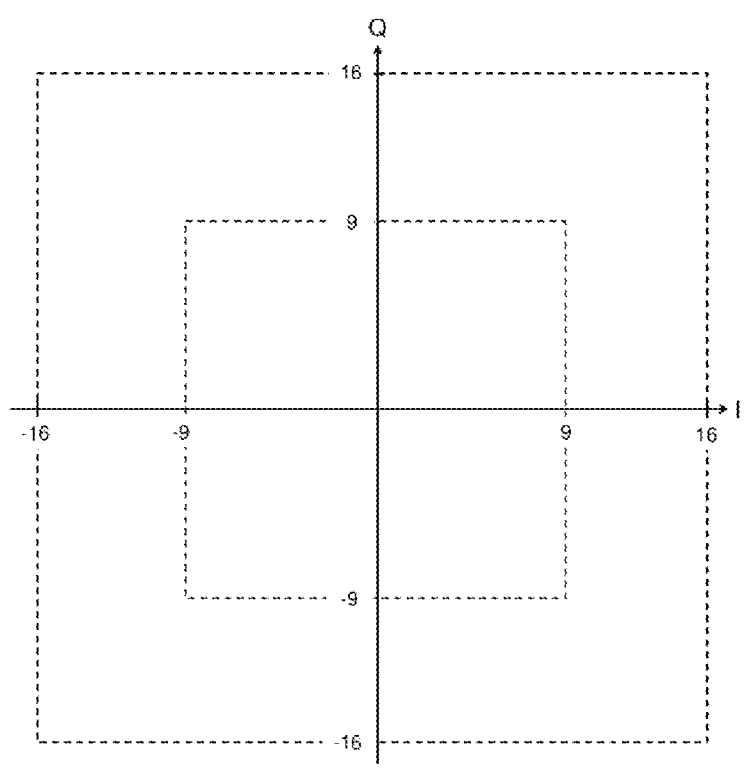
FIG. 13 is an IQ plane used when a received modulated signal is identified in a configuration in which (8, 0, 0, 0) is used as a four-dimensional QAM signal.

FIG. 13 is an IQ plane used when a received modulated signal is identified in a configuration in which (8, 0, 0, 0) is used as a four-dimensional QAM signal. From the reason described above, a two-dimensional plane with the I coordinate ranging from −16 to 16 and with the Q coordinate ranging from −16 to 16 is used. However, in actuality, only a part of a region of the IQ plane (specifically, a region with the I coordinate ranging from −9 to 9 and with the Q coordinate ranging from −9 to 9) is used. In other words, the part of the region is divided into a plurality of areas, and is used for decision of the received modulated signal. Because only a part of the region is used on the extended IQ plane, the signal to noise power ratio (SNR) is reduced in demodulation processing of the modulated signal. The amplitude of the signal is substantially halved, and thus the SNR with respect to average power is reduced by approximately 6 dB.

In particular, the communication apparatus (in the present example, the terminal apparatus 200) for which high-speed operation of several tens of megahertz to several gigahertz is required is implemented with the fixed-point arithmetic method. Thus, the SNR is reduced along with the extension of the IQ plane.

When signals outside the combination of the first constellation and the second constellation are selected with magnitude of the amplitude given high priority, the issue as described above is presented. The issue may occur when the multilevel number of 4D-QAM is larger than that in the configuration described in NPL 1 (in other words, 4D-256-QAM).

In contrast, the 4D-constellation in the present example embodiment is part of a combination of the first constellation and the second constellation. In this manner, by applying a limitation on the 4D-constellation, there are advantages as described below.

Figure 14:
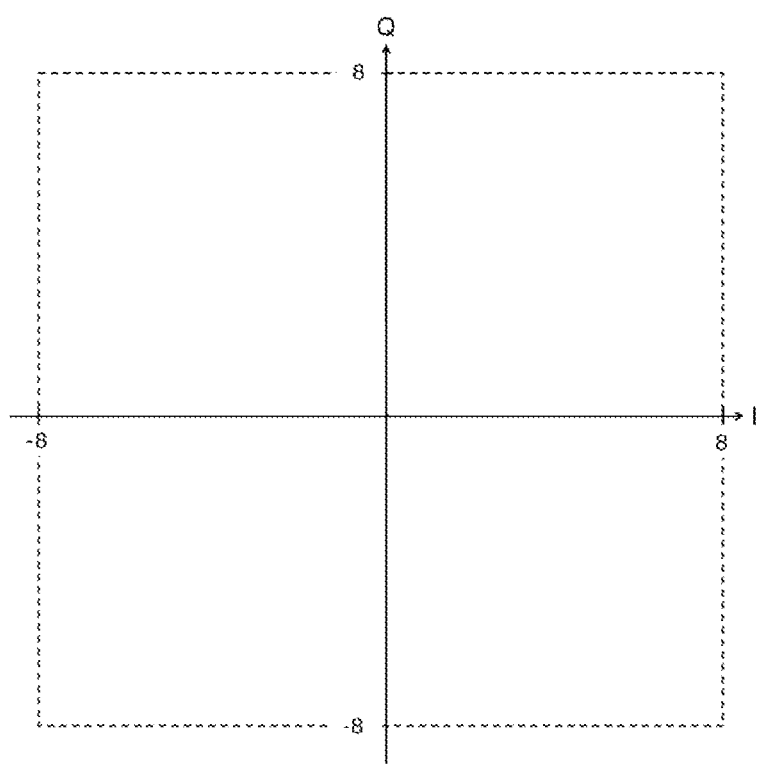
FIG. 14 is an IQ plane used when the terminal apparatus identifies a received modulated signal in the first example embodiment.

FIG. 14 is an IQ plane used when the terminal apparatus 200 identifies a received modulated signal in the present example embodiment. The signal demodulator 232 of the terminal apparatus 200 divides the IQ plane of FIG. 14 into a plurality of area. Then, the signal demodulator 232 determines in which area the signal point of the received modulated signal is present in each of a plurality of time slots.

As can be understand from FIG. 14, a signal representation range is the same as that of the case of 2D-64-QAM. The signal demodulator 232 can determine (identify) the received modulated signal through the same quantization as 2D-64-QAM. In this configuration, average power is slightly higher than a case in which (8, 0, 0, 0) is used as a four-dimensional QAM signal. However, the increase of the average power is a slight increase, and is considerably smaller than the reduction (approximately 6 dB) of the SNR. In other words, in the configuration of the present example embodiment, by permitting slight degrade (increase of average power) in the apparatus, greater degrade (significant reduction of the SNR) can be avoided.

In addition, in the 4D-constellation, the layout of the signal points is symmetric with respect to the I axis and symmetric with respect to the Q axis.

"The layout of the signal points is symmetric with respect to the I axis" means that the number of signal points and positions present in the region on the upper side of the Q axis (in other words, the region in which the Q coordinate is positive) and the number of signal points and positions present in the region on the lower side of the Q axis (in other words, the region in which the Q coordinate is negative) are the same.

"The layout of the signal points is symmetric with respect to the Q axis" means that the number of signal points and positions present in the region on the right side of the I axis (in other words, the region in which the I coordinate is positive) and the number of signal points and positions present in the region on the left side of the I axis (in other words, the region in which the I coordinate is negative) are the same.

This is because control (for example, carrier recovery and the like) executed by the terminal apparatus 200 that demodulates the four-dimensional QAM signal presupposes that the 4D-constellation and occurrence probability of the signal points on the 4D-constellation keeps symmetry with respect to the I axis and the Q axis.

Note that the signal points may also be present on the I axis or on the Q axis. In the present example, the layout of the signal points has symmetry except for the signal points on the I axis or on the Q axis.

<3-6. Flow of Processing>

Figure 15:
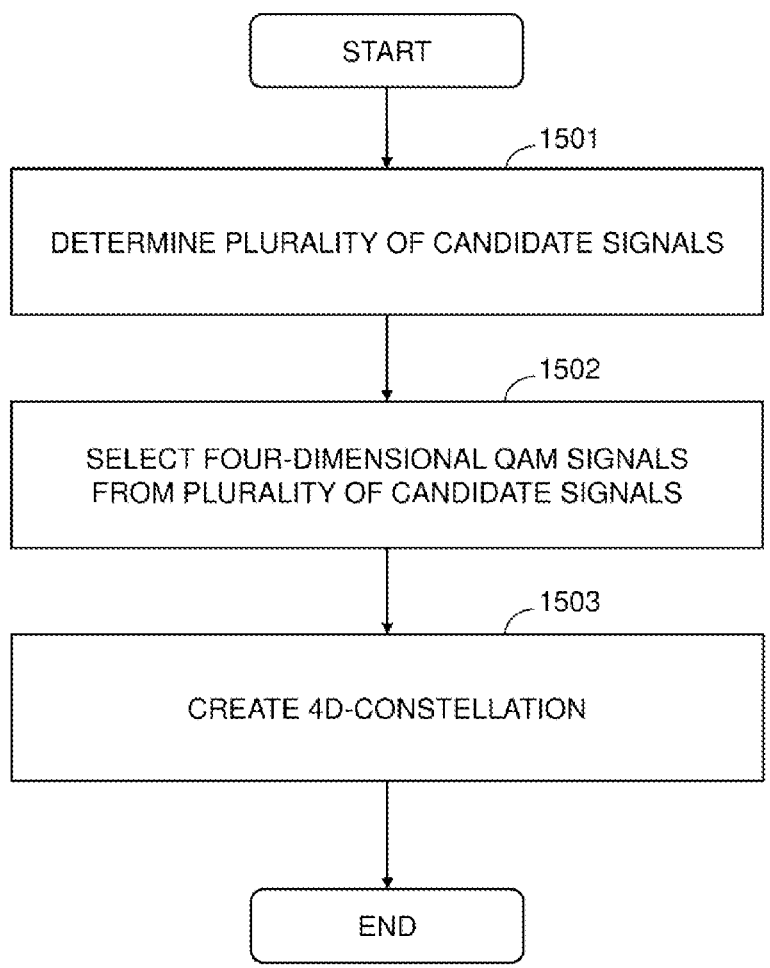
FIG. 15 is a flowchart illustrating an example of a flow of processing of creating the constellation for 4D-4096-QAM.

Next, with reference to FIG. 15, a flow of processing of creating a 4D-constellation for 4D-4096-QAM will be described. FIG. 15 is a sequence diagram illustrating an example of a flow of processing of the calculation apparatus 300.

The processing unit 320 determines a plurality of candidate signals (1501). Specifically, as described above, the processing unit 320 determines a plurality of reference signals, based on a start point signal. Then, as described above, the processing unit 320 determines the plurality of candidate signals by inverting the sign of the coordinates and rearranging the order of the coordinates regarding each of the plurality of reference signals.

In the present example, the start point signal is at (1, 1, 1, 1). The plurality of reference signals include the start point signal, a first set being a set of signals each of whose distances $d_4$ from the start point signal is "2", a second set being a set of signals each of whose distances $d_4$ from an element of the first set is "2", . . . , and an i-th set being a set of signals each of whose distances $d_4$ from an element of an (i-1)-th set is "2". Note that i is set so that the number of candidate signals to be ultimately obtained is greater than 4096.

Note that, similarly to the above description, the plurality of candidate signals include only a set of first signals and a set of second signals from the viewpoint of maintaining the minimum distance between signals.

First signal: A signal point with $(I_1, Q_1)$ of the first constellation and a signal point with $(I_2, Q_2)$ of the first constellation. In other words, the first signal is a signal defined by a combination of a signal point of the first constellation in TS1 and a signal point of the first constellation in TS2.

Second signal: A signal point with $(I_1, Q_1)$ of the second constellation and a signal point with $(I_2, Q_2)$ of the second constellation. In other words, the second signal is a signal defined by a combination of a signal point of the second constellation in TS1 and a signal point of the second constellation in TS2.

Accordingly, the plurality of candidate signals are determined so that the candidate signals do not include coordinates of signal points other than the combination of the first constellation and the second constellation.

The processing unit 320 selects four-dimensional QAM signals from the plurality of candidate signals (the set of first signals and the set of second signals) (1502). The processing unit 320 selects the four-dimensional QAM signals from the plurality of candidate signals in ascending order of amplitude from one having the smallest amplitude. The four-dimensional QAM signals are a combination of a modulated signal corresponding to the signal point $(I_1, Q_1)$ in TS1 and a modulated signal corresponding to the signal point $(I_2, Q_2)$ in TS2. Accordingly, the processing unit 320 selects the four-dimensional QAM signals in ascending order of amplitudes from combinations of the amplitude of the modulated signal in TS1 and the amplitude of the modulated signal in TS2.

In addition, the processing unit 320 selects the four-dimensional QAM signals from the plurality of candidate signals such that the layout of the signal points is symmetric with respect to the I axis and symmetric with respect to the Q axis.

Then, the processing unit 320 creates a 4D-constellation, based on the selected four-dimensional QAM signals (1503). In addition, the processing unit 320 may create mapping information, based on the 4D-constellation. The 4D-constellation and the mapping information are provided to the base station 100 and the terminal apparatus 200 via a storage medium or a network.

Figure 16:
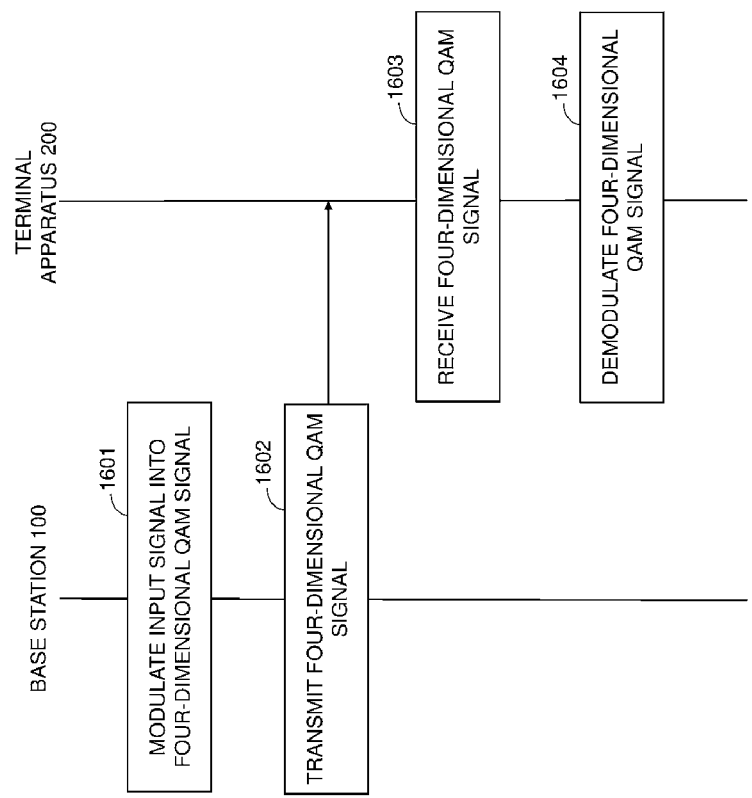
FIG. 16 is a sequence diagram illustrating an example of a flow of processing in a radio communication system.

Next, with reference to FIG. 16, operation of each of the constituent elements in the radio communication system will be described. FIG. 16 is a sequence diagram illustrating an example of a flow of processing in the radio communication system.

The signal modulator 141 of the base station 100 modulates an input signal into a four-dimensional QAM signal in accordance with modulation information stored in the storage unit 130 (1601).

The transmitter 142 of the base station 100 transmits the four-dimensional QAM signal to the terminal apparatus 200 (1602). The transmitter 142 transmits the four-dimensional QAM signal to the terminal apparatus 200 using two consecutive time slots (TS1 and TS2 ).

The receiver 231 of the terminal apparatus 200 receives the four-dimensional QAM signal (1603).

The signal demodulator 232 of the terminal apparatus 200 demodulates the four-dimensional QAM signal (1604). The signal demodulator 232 demodulates the four-dimensional QAM signal, according to the method described in NPL 1. Specifically, first, regarding TS1, the signal demodulator 232 calculates a first distance ds1. The first distance ds1 is a distance between a signal point (hereinafter referred to as a "first reception point") representing the modulated signal received in TS1 and a signal point S1a closest to the first reception point among the signal points of the first constellation. Next, regarding TS2, the signal demodulator 232 calculates a second distance ds2. The second distance ds2 is a distance between a signal point (hereinafter referred to as a "second reception point") representing the modulated signal received in TS2 and a signal point S1b closest to the second reception point among the signal points of the first constellation. The signal demodulator 232 calculates a sum dsm1 of the first distance ds1 and the second distance ds2.

In addition, regarding TS1, the signal demodulator 232 calculates a third distance ds3. The third distance ds3 is a distance between the first reception point and a signal point S2a closest to the first reception point among the signal points of the second constellation. Next, regarding TS2, the signal demodulator 232 calculates a fourth distance ds4. The fourth distance ds4 is a distance between the second reception point and a signal point S2b closest to the second reception point among the signal points of the second constellation. The signal demodulator 232 calculates a sum dsm2 of the third distance ds3 and the fourth distance ds4.

The signal demodulator 232 determines that a combination of signal points corresponding to the smaller one of the sum dsm1 and the sum dsm2 is received as the four-dimensional QAM signal. For example, when the sum dsm1 is smaller than the sum dsm2, the signal demodulator 232 determines that a combination of the signal point S1a and the signal point S1b is received as the four-dimensional QAM signal. When the sum dsm2 is smaller than the sum dsm1, the signal demodulator 232 determines that a combination of the signal point S2a and the signal point S2b is received as the four-dimensional QAM signal. Note that the signal demodulator 232 may demodulate the four-dimensional QAM signal according to a method other than the method described in the above.

<3-7. Effects>

Figure 17:
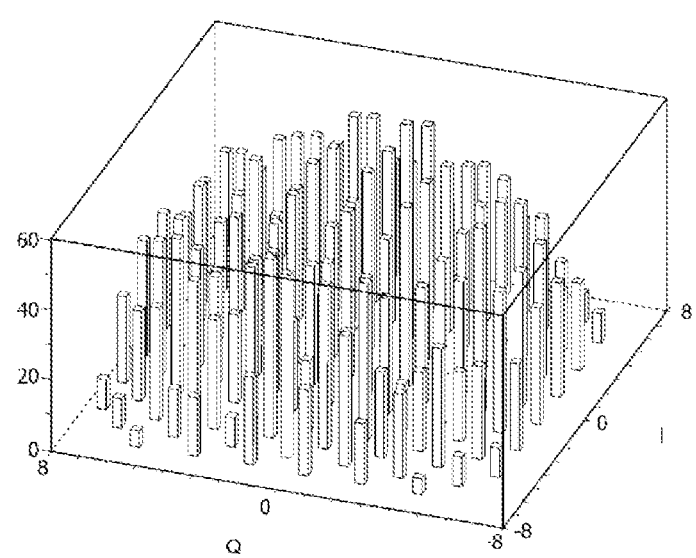
FIG. 17 is a diagram in which occurrence probability of each signal point in a first time slot (TS1) in 4D-4096-QAM is illustrated on the IQ plane.

The configuration described above produces the following effects. FIG. 17 is a diagram in which occurrence probability of each signal point in TS1 in 4D-4096-QAM is illustrated on the IQ plane. Occurrence probability of a signal point far from the origin on the IQ plane is low. This tendency is the same in TS2 as well. Regarding the four-dimensional QAM signal, even when a signal point far from the origin (in other words, a signal point having large amplitude) is selected in TS1, a signal point close to the origin (in other words, a signal point having small amplitude) is selected in TS2. Accordingly, average power of modulated signals is reduced. Thus, according to the above configuration, by enhancing signal point density, average power of modulated signals can be reduced. CNR to symbol error rate (SER) characteristics are improved by a degree corresponding to the reduction degree of the average power of modulated signals, in comparison to 2D-QAM.

In ultra-multilevel QAM, usually, LDPC codes are applied as FEC. In contrast, according to the example embodiment described above, FEC with costs and power consumption lower than those of the LDPC codes can be applied. For example, Reed-Solomon (RS) codes can be applied. In this case, a large-scale circuit is not necessary. Costs and power consumption are significantly smaller than when the LDPC codes are applied. In addition, even when the RS codes are applied, transmission characteristics equivalent to those when the LDPC codes are applied can be obtained.

In addition, when 2D-QAM is configured in a multidimensional manner, significant reduction of the SNR in the demodulation processing as described above occurs. The configuration described above can prevent reduction of the SNR in the demodulation processing.

<3-8. Generalization of Configuration of Constellation>

Based on the contents described above, the configuration of the constellation when 2D-QAM is configured in a multidimensional manner can be generalized as follows.

(1) Configuring 2D-QAM whose Multilevel Number is Even Power of 2 in Multidimensional Manner Examples of 2D-QAM whose multilevel number is an even power of 2 include 64-QAM and 256-QAM. Such 2D-QAM is hereinafter referred to as "two-dimensional M-QAM". M is an even power of 2 and is equal to or greater than 64. When two-dimensional M-QAM is configured in a multidimensional manner using a plurality of consecutive time slots, the constellation for multidimensional QAM has the following configuration.

The constellation for multidimensional QAM is part of a combination of a first constellation and a second constellation.

The first constellation is a constellation of two-dimensional M-QAM.

The second constellation is a constellation of "two-dimensional QAM in which the number of signal points arrayed in the I axis direction is smaller than that of the first constellation by 1 and the number of signal points arrayed in the Q axis direction is smaller than that of the first constellation by 1".

In other words, the second constellation is a constellation of following two-dimensional QAM.

$$(\sqrt{M}-1)^2\text{-QAM}$$

In the constellation for multidimensional QAM, the layout of the signal points is symmetric with respect to the I axis and symmetric with respect to the Q axis.

In addition, a multidimensional QAM signal is a signal selected from a plurality of candidate signals in ascending order of amplitude from one having the smallest amplitude. The plurality of candidate signals are signals obtained from a combination of the first constellation and the second constellation.

For example, in a case of 4D-4096-QAM in which 2D-64-QAM is configured in a four-dimensional manner as in the example embodiment described above, the 4D-constellation is part of a combination of a constellation of 2D-64-QAM and a constellation of 2D-49-QAM.

In another example, in a case of 4D-65536-QAM in which 2D-256-QAM is configured in a four-dimensional manner, the 4D-constellation is part of a combination of a constellation of 2D-256-QAM and a constellation of 2D-225-QAM.

Figure 18:
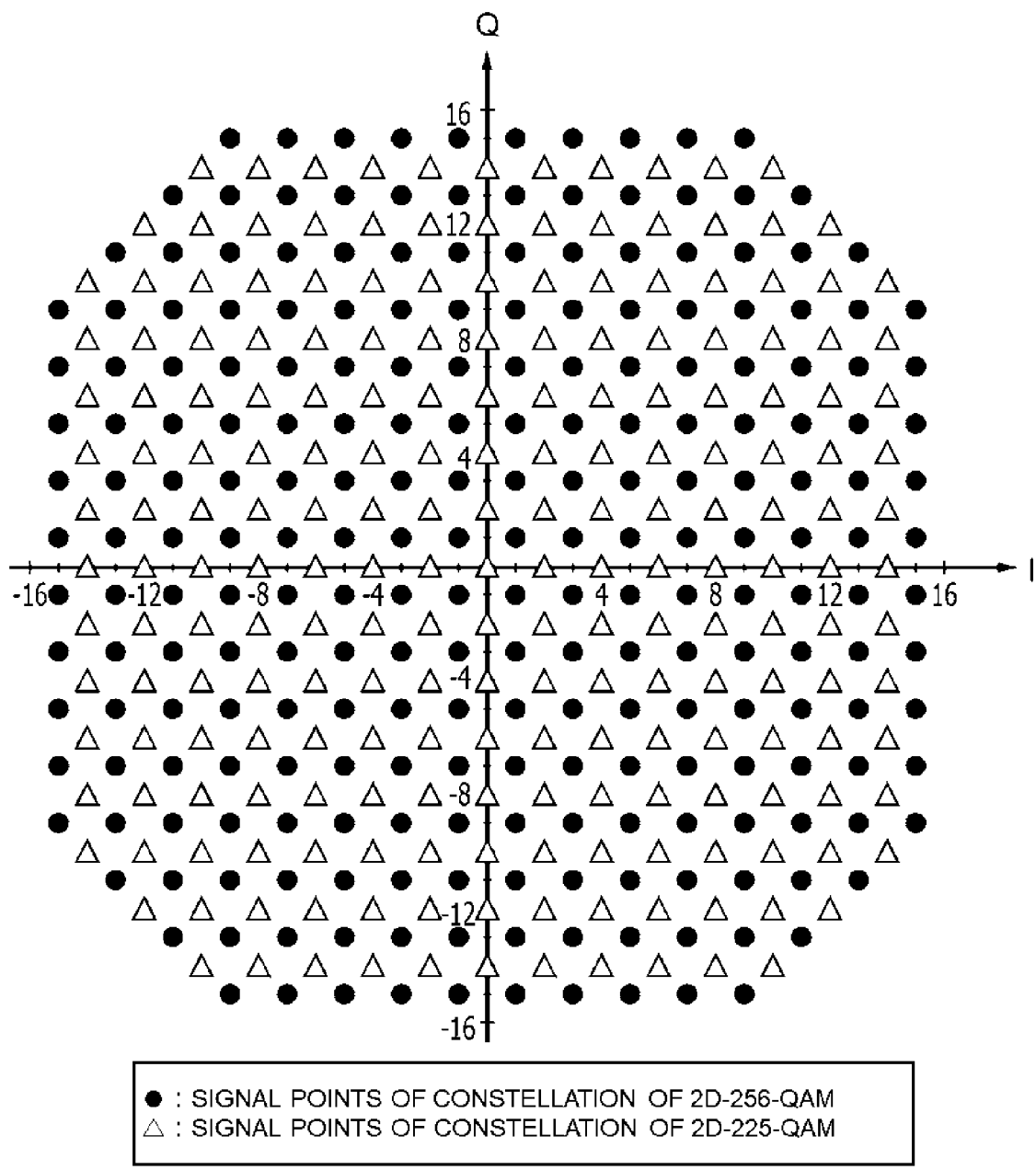
FIG. 18 is an example of a constellation of a case of 4D-65536-QAM in which 2D-256-QAM is configured in a four-dimensional manner.

FIG. 18 is an example of a 4D-constellation of a case of 4D-65536-QAM in which 2D-256-QAM is configured in a four-dimensional manner. The signal points of the 4D-constellation include a part of signal points (232 signal points) of the signal points of the constellation of 2D-256-QAM and a part of signal points (213 signal points) of the signal points of the constellation of 2D-225-QAM. Accordingly, the 4D-constellation includes 445 signal points. Note that, in FIG. 18, circle points denote the signal points of the constellation of 2D-256-QAM. The signal points of the constellation of 2D-256-QAM are present on odd-numbered lattice points in the IQ plane. Triangle points denote the signal points of the constellation of 2D-225-QAM. The signal points of the constellation of 2D-225-QAM are present on even-numbered lattice points in the IQ plane. Note that one of the signal points of the constellation of 2D-225-QAM is present at the origin (0, 0). In this configuration as well, the effects described above can be obtained.

(2) Configuring 2D-QAM whose Multilevel Number is Odd Power of 2 in Multidimensional Manner Examples of 2D-QAM whose multilevel number is an odd power of 2 include 32-QAM and 128-QAM. Such 2D-QAM is hereinafter referred to as "two-dimensional N-QAM". N is an odd power of 2 and is equal to or greater than 32. When two-dimensional N-QAM is configured in a multidimensional manner using a plurality of consecutive time slots, the constellation for multidimensional QAM has the following configuration.

The constellation for multidimensional QAM is part of a combination of a first constellation and a second constellation.

The first constellation is a constellation of two-dimensional N-QAM.

The second constellation is a constellation of "two-dimensional QAM in which the number of signal points arrayed in the I axis direction is smaller than that of the first constellation by 1 and the number of signal points arrayed in the Q axis direction is smaller than that of the first constellation by 1".

In other words, the second constellation is a constellation of following two-dimensional QAM.

$$\left(\sqrt{\frac{N}{2}}+1\right)^2-QAM$$

According to the configuration, the effects described above can be obtained.

In addition, in the constellation for multidimensional QAM, the layout of the signal points is symmetric with respect to the I axis and symmetric with respect to the Q axis.

In addition, a multidimensional QAM signal is a signal selected from a plurality of candidate signals in ascending order of amplitude from one having the smallest amplitude. The plurality of candidate signals are signals obtained from a combination of the first constellation and the second constellation.

Figure 19:
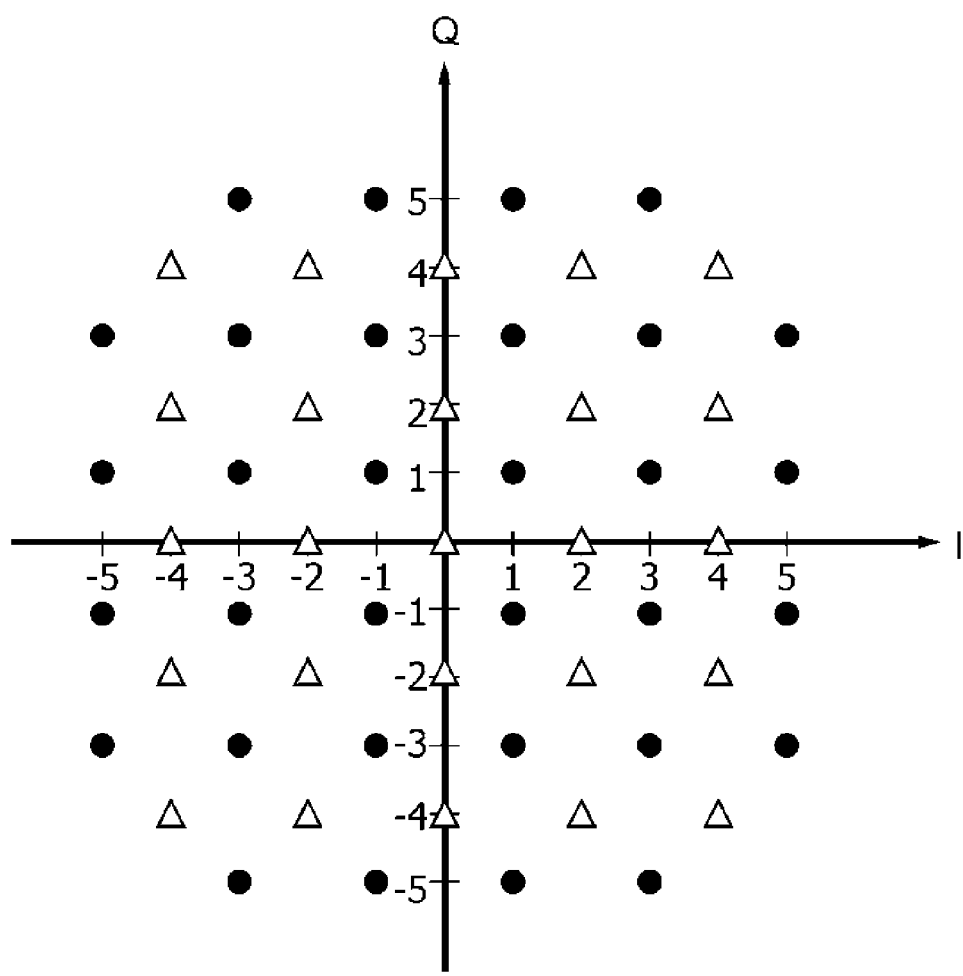
FIG. 19 is an example of a constellation of a case in which 2D-32-QAM is configured in a four-dimensional manner.

FIG. 19 is an example of a 4D-constellation of a case in which 2D-32-QAM is configured in a four-dimensional manner. The signal points of the 4D-constellation include a part of signal points (32 signal points) of the signal points (36 (=6×6) signal points) of the constellation of 2D-32-QAM, and signal points (25 signal points) of the constellation of 2D-25-QAM. Accordingly, the 4D-constellation includes 57 signal points. Note that, in FIG. 19, circle points denote the signal points of the constellation of 2D-32-QAM. The signal points of the constellation of 2D-32-QAM are present on odd-numbered lattice points in the IQ plane. Triangle points denote the signal points of the constellation of 2D-25-QAM. The signal points of the constellation of 2D-25-QAM are present on even-numbered lattice points in the IQ plane. Note that one of the signal points of the constellation of 2D-25-QAM is present at the origin (0, 0).

<3-9. Example Alterations>

The technique related to the present disclosure is not limited to the example embodiment described above.

(1) First Example Alteration

The configuration described above can also be applied to multidimensional QAM other than 4D-QAM. For example, the configuration described above can also be applied to 8D-QAM in which 2D-QAM is configured in a multidimensional manner using four consecutive time slots.

(2) Second Example Alteration

The signal modulator 141 may apply probabilistic shaping (PS) to the modulation processing. PS is a technique of changing the occurrence probability of each signal symbol. According to PS, the occurrence probability of signal symbols having small amplitude is increased. As a result, average power can be further reduced.

One example of a method of specifically implementing PS is an autoencoder (AE). This technique is publicly known (for example, see NPL 2). Details thereof will thus be described below concisely.

In the 4D-constellation according to the example embodiment described above, a part (first part) of the signal points of one of the first constellation and the second constellation is present on the I axis. A part (second part) of the signal points of the one constellation is present on the Q axis. For example, in 4D-4096-QAM in which 2D-64-QAM is configured in a four-dimensional manner, as illustrated in FIG. 10, the first part of the second constellation (in other words, the constellation of 2D-49-QAM) is present on the I axis. Further, the second part of the second constellation is present on the Q axis. By applying an autoencoder to the 4-D constellation having such a configuration, PS can be implemented.

The autoencoder is one type of neural network for machine learning. The autoencoder has information of a communication channel, and operates to minimize an evaluation function by using the neural network.

Figure 20:
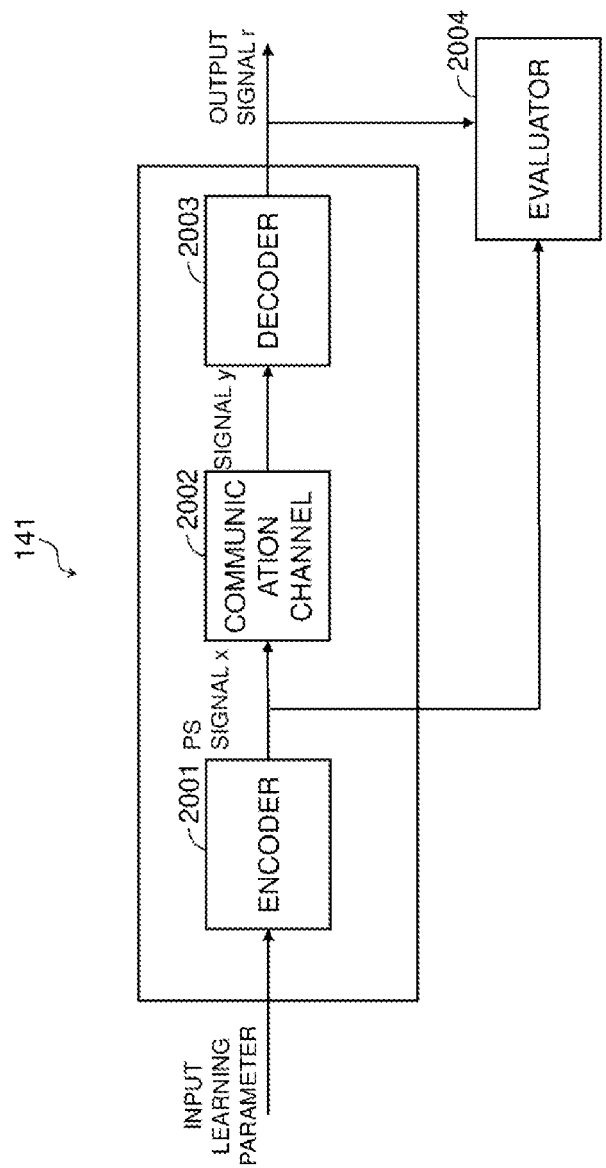
FIG. 20 is a block diagram illustrating an example of a configuration of a signal modulator including a function of an autoencoder.

FIG. 20 is a block diagram illustrating an example of a configuration of the signal modulator 141 including a function of the autoencoder and is a configuration specifically for the 4D probabilistic shaping optimization. The signal modulator 141 includes an encoder 2001, a communication channel 2002, a decoder 2003, and an evaluator 2004.

The encoder 2001 outputs a probabilistically shaped 4D signal x using a plurality of neural network layers. This processing is processing of generating the occurrence probability distribution of the 4D constellation and hence generating the four-dimensional QAM signal (signal x) by using a 4D constellation.

The communication channel 2002 adds thermal noise to the signal x, and outputs a signal y.

The decoder 2003 decodes the signal y by using the plurality of neural network layers, and outputs an output signal r. This processing is processing of collectively handling signals in a plurality of time slots (TS1 and TS2 ) as four-dimensional QAM signals and decoding the four-dimensional QAM signals.

The evaluator 2004 inputs the signal s and the output signal r to the evaluation function. For example, the evaluation function is a function related to the Hamming distance between the de-mapped signal x and the de-mapped signal r. This processing includes processing of de-mapping the signal point in the 4D-constellation to a bit sequence.

The learning processing of the autoencoder is executed with different input learning parameter by using an iterative learning algorithm (for this example, it is stochastic gradient descent) such that the value of the evaluation function becomes smaller. To be more specific, the input learning parameter for the 4D PS optimisation is the CNR value. In the learning process, the occurrence probability of signal symbols having small amplitude is increased, and average power is thus reduced. As a result, the CNR to SER characteristics are improved.

(3) Third Example Alteration

The processing unit 320 of the calculation apparatus 300 may execute processing of optimizing a mapping rule of a bit sequence to symbols of four-dimensional QAM signals. Such processing is hereinafter referred to as "mapping rule optimization processing".

When many bit errors occur for one signal symbol, a bit error rate (BER) for the same SER deteriorates. Thus, the processing unit 320 may optimize the above mapping rule.

In a case of 2D-QAM, regarding each signal symbol (hereinafter referred to as a "target symbol"), the number of signal symbols (hereinafter referred to as "nearest symbols") whose Euclidean distance from the target symbol is the smallest is four. The Hamming distance between the target symbol and each of the nearest symbols is "1". Thus, applying gray mapping to $2^{2k}$-QAM is optimal. In this case, BER=SER/$2^{2k}$.

In contrast, in a case of 4D-QAM, the number of nearest symbols is large. The number of nearest symbols is at most 24, and BER>SER/$2^{2k}$. Accordingly, the BER when gray mapping is virtually applied to the four-dimensional QAM signals is the theoretical lower limit of the BER. The mapping rule that implements the BER close to the lower limit can be obtained through optimization of mapping of a bit sequence in consideration of 24 nearest symbols. However, it is difficult to manually obtain such a mapping rule through trial and error, or theoretically obtain such a mapping rule.

In view of the above, the processing unit 320 obtains a mapping rule using an optimization algorithm. Examples of the optimization algorithm include binary switching algorithm (BSA) and reactive tabu search. Such optimization algorithms are publicly known (for example, see NPL 3 and NPL 4). Note that the optimization algorithm may be determined in consideration of required characteristics, a computation amount, and the like.

For example, the processing unit 320 executes the mapping rule optimization processing using reactive tabu search. Note that, in the following, processing of a case of 4D-256-QAM will be described for the sake of simplicity of description. The contents described below can also be applied to 4D-QAM whose multilevel number is larger than 256. In addition, the contents described below can also be applied to multidimensional QAM other than 4D-QAM.

The storage unit 310 stores a set S of 4D-constellations and a set B (initial set) of mapping of bit sequences in advance. The set S is a set of column vectors representing four-dimensional QAM signals obtained from a 4D-constellation determined in advance. As described above, the column vector is coordinate information including four coordinate values (in other words, coordinates in TS1 and coordinates in TS2). The set B is a set of bit sequences (8 bits) assigned to the four-dimensional QAM signals.

The processing unit 320 starts with the set S and the set B stored in the storage unit 310, and repeatedly updates the set S and the set B such that a value of an evaluation function F is minimized.

The processing unit 320 defines a set T referred to as a tabu list, and prohibits returning to solutions (so-called prohibited solutions) included in the set T. At the time point when the processing unit 320 starts processing, the set T is empty.

When the processing unit 320 starts processing, the processing unit 320 searches for solutions (combination of the set S and the set B). The processing unit 320 applies the evaluation function F to the searched solutions, and thereby determines the best solution in the search range as a candidate for an optimal solution. For example, the processing unit 320 registers a set of solutions obtained through search with the set T. Next, the processing unit 320 searches for the best solution among solutions not included in the set T. The processing unit 320 repeats this processing until a predetermined end condition is satisfied. The processing unit 320 outputs, as the optimal solution, the candidate for the optimal solution at the time point when the end condition is satisfied. Note that the end condition may include a condition of calculation time, a condition of the value of the evaluation function F, and/or the like.

The processing unit 320 may use the following evaluation function F. The evaluation function F is a function of calculating a value corresponding to the product of the Hamming distance and the error rate that is calculated based on the Euclidean distance.

$$F = \frac{1}{M}\sum_{i=1}^{M}\sum_{\substack{j=1 \\ j \neq i}}^{M} h(b_i, b_j) Q\left(\sqrt{\frac{\|s_i - s_j\|_2^2}{4\sigma^2}}\right)$$

Constituent elements of the evaluation function F will be described together with numerical values of a case of 4D-256-QAM. M is a multilevel number of QAM. In the case of 4D-256-QAM, M=256. $s_i$ and $s_j$ are each a column vector representing any four-dimensional QAM signal belonging to the set S. In the case of 4D-256-QAM, $s_i$ and $s_j$ are each coordinate information including four coordinate values (coordinates in TS1 and coordinates in TS2 ). Note that i and j are row numbers in the set S.

$b_i$ is a vector of bits corresponding to $s_i$ in $B_{temp}$, and $b_j$ is a vector of bits corresponding to $s_j$ in $B_{temp}$. $B_{temp}$ is a set of the current mapping in an update procedure. In the case of 4D-256-QAM, $b_i$ and $b_j$ are each a vector representing 8 bits.

$h(b_i, b_j)$ is the Hamming distance between $b_i$ and $b_j$ in $B_{temp}$. $\sigma^2$ is noise power. n is a number representing dimension. In the case of 4D-256-QAM, n=4. $Q(\cdot)$ is a Q function. The Q function is a function used for calculating the SER from a value corresponding to the CNR. $\|\cdot\|_2$ is the Euclidean norm, and is a four-dimensional Euclidean distance in the case of 4D-256-QAM.

The optimal solution output by the processing unit 320 is an optimal mapping rule of a bit sequence to four-dimensional QAM signals. The mapping rule is provided to the base station 100 and the terminal apparatus 200 as the mapping information. According to the configuration, the occurrence probability of signal symbols having small amplitude is increased, and average power is thus reduced. As a result, the CNR to BER characteristics are improved. It is confirmed that the CNR to BER characteristics in the case of 4D-256-QAM are improved in BER=1×10$^{-2}$ as compared to 2D-16-QAM. Note that, when the autoencoder is implemented, there are additional advantages as described below. By replacing a part of a circuit with another circuit after the mapping rule is learned, the scale of the circuit can be reduced.

Note that the evaluation function F is not limited to the example described above. The evaluation function F may be a function that has a maximum value when an optimal solution is obtained. The evaluation function F may be another function as long as the evaluation function F is a function including the Hamming distance and the error rate that is calculated based on the Euclidean distance. The Q function included in the evaluation function may be the number of interpolation error.

(4) Fourth Example Alteration

The terminal apparatus 200 may include the functions of the signal modulator 141 and the transmitter 142. The base station 100 may include the functions of the receiver 231 and the signal demodulator 232. In other words, the terminal apparatus 200 may modulate an input signal into a four-dimensional QAM signal, and transmit the four-dimensional QAM signal to the base station 100. The base station 100 may receive the four-dimensional QAM signal, and demodulate the four-dimensional QAM signal.

<<4. Second Example Embodiment>>

Next, with reference to FIG. 21 to FIG. 22, a second example embodiment will be described. The above-described first example embodiment is a concrete example embodiment, whereas the second example embodiment is a more generalized example embodiment.

<4-1. Configuration of Signal Modulation Apparatus>

Figure 21:
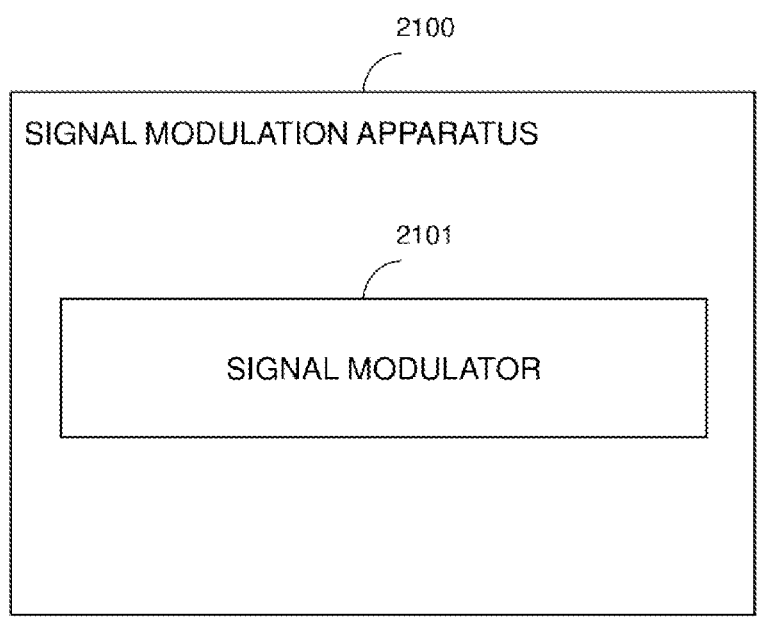
FIG. 21 is a block diagram illustrating an example of a configuration of a signal modulation apparatus according to a second example embodiment.

FIG. 21 is a block diagram illustrating an example of a configuration of the signal modulation apparatus 2100. The signal modulation apparatus 2100 includes a signal modulator 2101.

The signal modulator 2101 may be implemented with one or more processors and a memory. The one or more processors may include, for example, one or more of a CPU, an MPU, and a micro controller. The memory may include a volatile memory and a non-volatile memory. The memory may store a program code (instructions). The one or more processors may implement the function of the signal modulator 2101 by executing the program code stored in the memory.

The signal modulator 2101 configures 2D-QAM whose multilevel number is an even power of 2 or 2D-QAM whose multilevel number is an odd power of 2, in a multidimensional manner as described below.

(1) Configuring 2D-QAM whose Multilevel Number is Even Power of 2 in Multidimensional Manner The signal modulator 2101 modulates an input signal into a multidimensional QAM signal using multidimensional QAM. Multidimensional QAM is QAM in which two-dimensional M-QAM is configured in a multidimensional manner using a plurality of consecutive time slots. M is an even power of 2 and is equal to or greater than 64.

A constellation for multidimensional QAM is part of a combination of a first constellation and a second constellation.

The first constellation is a constellation of two-dimensional M-QAM.

The second constellation is a constellation of following two-dimensional QAM.

$(\sqrt{M}-1)^2$–QAM

In the constellation for multidimensional QAM, the layout of the signal points may be symmetric with respect to the I axis and symmetric with respect to the Q axis.

The multidimensional QAM signal may be a signal selected from a plurality of candidate signals in ascending order of amplitude from one having the smallest amplitude. The plurality of candidate signals are signals obtained from a combination of the first constellation and the second constellation.

(2) Configuring 2D-QAM whose Multilevel Number is Odd Power of 2 in Multidimensional Manner The signal modulator 2101 modulates an input signal into a multidimensional QAM signal using multidimensional QAM. Multidimensional QAM is QAM in which two-dimensional N-QAM is configured in a multidimensional manner using a plurality of consecutive time slots. N is an odd power of 2 and is equal to or greater than 32.

A constellation for multidimensional QAM is part of a combination of a first constellation and a second constellation.

The first constellation is a constellation of two-dimensional N-QAM.

The second constellation is a constellation of following two-dimensional QAM.

$$\left(\sqrt{\frac{N}{2}}+1\right)^2 - QAM$$

In the constellation for multidimensional QAM, the layout of the signal points may be symmetric with respect to the I axis and symmetric with respect to the Q axis.

The multidimensional QAM signal may be a signal selected from a plurality of candidate signals in ascending order of amplitude from one having the smallest amplitude. The plurality of candidate signals are signals obtained from a combination of the first constellation and the second constellation.

<4-2. Flow of Processing>

FIG. 22 is a flowchart for illustrating an example of a flow of processing of the signal modulation apparatus 2100. As described above, the signal modulator 2101 modulates an input signal into a multidimensional QAM signal using multidimensional QAM (2201). The signal modulator 2101 outputs the multidimensional QAM signal (2202).

According to the above configuration, costs and power consumption can be reduced in ultra-multilevel QAM.

Note that the first example embodiment and each of its example alterations can be applied to the second example embodiment as well. For example, the signal modulator 2101 may use the autoencoder to optimize the occurrence probability of each signal point in the constellation of the multidimensional QAM signals in terms of the amplitude of the multidimensional QAM signals.

Note that the example embodiments and the example alterations described above are merely examples, and the scope of technical ideas of the present disclosure is not limited to the configurations described above. Other aspects conceivable within the scope of technical ideas of the present disclosure are included in the scope of the present disclosure.

The functions of the apparatuses (the base station 100, the terminal apparatus 200, the calculation apparatus 300, and the signal modulation apparatus 2100) described in the Specification may be implemented with one of software, hardware, and a combination of software and hardware. A program code (instructions) constituting the software may be stored in a computer readable recording medium inside or outside each of the apparatuses, for example, and when being executed, may be read in a memory to be executed by a processor. Moreover, non-transitory computer readable recording media (non-transitory computer readable media) having recorded thereon the program code may be provided.

The whole or part of the example embodiments and the example alterations described above can be described as, but not limited to, the following supplementary notes.

(Supplementary Note 1)

A signal modulation apparatus including a signal modulator configured to modulate an input signal into a multidimensional QAM signal using multidimensional QAM, wherein the multidimensional QAM is QAM in which two-dimensional M-QAM is configured in a multidimensional manner using a plurality of consecutive time slots, the two-dimensional M-QAM is QAM in which signal points of signal symbols representing a bit sequence are assigned to a two-dimensional plane with an in-phase axis and a quadrature axis, M is an even power of 2 and is equal to or greater than 64, a constellation for the multidimensional QAM is part of a combination of a first constellation and a second constellation, the first constellation is a constellation of the two-dimensional M-QAM, and the second constellation is a constellation of following two-dimensional QAM.

$$(\sqrt{M}-1)^2\text{-QAM}$$

(Supplementary Note 2)

A signal modulation apparatus including a signal modulator configured to modulate an input signal into a multidimensional QAM signal using multidimensional QAM, wherein the multidimensional QAM is QAM in which two-dimensional N-QAM is configured in a multidimensional manner using a plurality of consecutive time slots, the two-dimensional N-QAM is QAM in which signal points of signal symbols representing a bit sequence are assigned to a two-dimensional plane with an in-phase axis and a quadrature axis, N is an odd power of 2 and is equal to or greater than 32, a constellation for the multidimensional QAM is part of a combination of a first constellation and a second constellation, the first constellation is a constellation of the two-dimensional N-QAM, and the second constellation is a constellation of following two-dimensional QAM.

$$\left(\sqrt{\frac{N}{2}}+1\right)^2 - QAM$$

(Supplementary Note 3)

The signal modulation apparatus according to supplementary note 1 or 2, wherein in the constellation for the multidimensional QAM, a layout of the signal points is symmetric with respect to the in-phase axis and symmetric with respect to the quadrature axis.

(Supplementary Note 4)

The signal modulation apparatus according to any one of supplementary notes 1 to 3, wherein the multidimensional QAM signal is a signal selected from a plurality of candidate signals in ascending order of amplitude from a candidate signal having smallest amplitude, and the plurality of candidate signals are signals obtained from the combination of the first constellation and the second constellation.

(Supplementary Note 5)

The signal modulation apparatus according to any one of supplementary notes 1 to 4, wherein in the constellation for the multidimensional QAM, a first part of the signal points of one constellation of the first constellation and the second constellation is present on the in-phase axis, and a second part of the signal points of the one constellation is present on the quadrature axis.

(Supplementary Note 6)

The signal modulation apparatus according to supplementary note 5, wherein the signal modulator is configured to optimize occurrence probability of each of the signal points in the constellation for the multidimensional QAM in terms of amplitude of the multidimensional QAM signal by using an autoencoder.

(Supplementary Note 7)

A signal modulation method including modulating an input signal into a multidimensional QAM signal using multidimensional QAM, wherein the multidimensional QAM is QAM in which two-dimensional M-QAM is configured in a multidimensional manner using a plurality of consecutive time slots, the two-dimensional M-QAM is QAM in which signal points of signal symbols representing a bit sequence are assigned to a two-dimensional plane with an in-phase axis and a quadrature axis, M is an even power of 2 and is equal to or greater than 64, a constellation for the multidimensional QAM is part of a combination of a first constellation and a second constellation, the first constellation is a constellation of the two-dimensional M-QAM, and the second constellation is a constellation of following two-dimensional QAM.

$$(\sqrt{M}-1)^2\text{-QAM}$$

(Supplementary Note 8)

A signal modulation method including modulating an input signal into a multidimensional QAM signal using multidimensional QAM, wherein the multidimensional QAM is QAM in which two-dimensional N-QAM is configured in a multidimensional manner using a plurality of consecutive time slots, the two-dimensional N-QAM is QAM in which signal points of signal symbols representing a bit sequence are assigned to a two-dimensional plane with an in-phase axis and a quadrature axis, N is an odd power of 2 and is equal to or greater than 32, a constellation for the multidimensional QAM is part of a combination of a first constellation and a second constellation, the first constellation is a constellation of the two-dimensional N-QAM, and the second constellation is a constellation of following two-dimensional QAM.

$$\left(\sqrt{\frac{N}{2}}+1\right)^2 - QAM$$

(Supplementary Note 9)

A non-transitory computer readable recording medium recording a program of causing at least one processor to execute modulating an input signal into a multidimensional QAM signal using multidimensional QAM, wherein the multidimensional QAM is QAM in which two-dimensional M-QAM is configured in a multidimensional manner using a plurality of consecutive time slots, the two-dimensional M-QAM is QAM in which signal points of signal symbols representing a bit sequence are assigned to a two-dimensional plane with an in-phase axis and a quadrature axis, M is an even power of 2 and is equal to or greater than 64, a constellation for the multidimensional QAM is part of a combination of a first constellation and a second constellation, the first constellation is a constellation of the two-dimensional M-QAM, and the second constellation is a constellation of following two-dimensional QAM.

$$(\sqrt{M}-1)^2 - QAM$$

(Supplementary Note 10)

A non-transitory computer readable recording medium recording a program of causing at least one processor to execute modulating an input signal into a multidimensional QAM signal using multidimensional QAM, wherein the multidimensional QAM is QAM in which two-dimensional N-QAM is configured in a multidimensional manner using a plurality of consecutive time slots, the two-dimensional N-QAM is QAM in which signal points of signal symbols representing a bit sequence are assigned to a two-dimensional plane with an in-phase axis and a quadrature axis, N is an odd power of 2 and is equal to or greater than 32, a constellation for the multidimensional QAM is part of a combination of a first constellation and a second constellation, the first constellation is a constellation of the two-dimensional N-QAM, and the second constellation is a constellation of following two-dimensional QAM.

$$\left(\sqrt{\frac{N}{2}}+1\right)^2 - QAM$$

(Supplementary Note 11)

A calculation apparatus including:

a memory configured to store an instruction (program code); and at least one processor configured to execute the instruction, wherein the at least one processor is configured to create a constellation for multidimensional QAM, the multidimensional QAM is QAM in which two-dimensional M-QAM is configured in a multidimensional manner using a plurality of consecutive time slots, the two-dimensional M-QAM is QAM in which signal points of signal symbols representing a bit sequence are assigned to a two-dimensional plane with an in-phase axis and a quadrature axis, M is an even power of 2 and is equal to or greater than 64, the constellation for the multidimensional QAM is a constellation for modulating an input signal into a multidimensional QAM signal, the constellation for the multidimensional QAM is part of a combination of a first constellation and a second constellation, the first constellation is a constellation of the two-dimensional M-QAM, and the second constellation is a constellation of following two-dimensional QAM.

$$(\sqrt{M}-1)^2 - QAM$$

(Supplementary Note 12)

A calculation apparatus including:

a memory configured to store an instruction (program code); and at least one processor configured to execute the instruction, wherein the at least one processor is configured to create a constellation for multidimensional QAM, the multidimensional QAM is QAM in which two-dimensional N-QAM is configured in a multidimensional manner using a plurality of consecutive time slots, the two-dimensional N-QAM is QAM in which signal points of signal symbols representing a bit sequence are assigned to a two-dimensional plane with an in-phase axis and a quadrature axis, N is an odd power of 2 and is equal to or greater than 32, the constellation for the multidimensional QAM is a constellation for modulating an input signal into a multidimensional QAM signal, the constellation for the multidimensional QAM is part of a combination of a first constellation and a second constellation, the first constellation is a constellation of the two-dimensional N-QAM, and the second constellation is a constellation of following two-dimensional QAM.

$$\left(\sqrt{\frac{N}{2}}+1\right)^2 - QAM$$

(Supplementary Note 13)

The calculation apparatus according to supplementary note 11 or 12, wherein the at least one processor is configured to select the multidimensional QAM signal from a plurality of candidate signals such that a layout of the signal points in the constellation for the multidimensional QAM is symmetric with respect to the in-phase axis and symmetric with respect to the quadrature axis, and the plurality of candidate signals are signals obtained from the combination of the first constellation and the second constellation.

(Supplementary Note 14)

The calculation apparatus according to supplementary note 13, wherein
the at least one processor is configured to select the multidimensional QAM signal from the plurality of candidate signals in ascending order of amplitude from a candidate signal having smallest amplitude.

(Supplementary Note 15)

A calculation apparatus including:
a memory configured to store an instruction (program code); and
at least one processor configured to execute the instruction, wherein
the at least one processor is configured to execute optimization processing of optimizing a mapping rule of a bit sequence to a multidimensional QAM signal in multidimensional QAM,
the multidimensional QAM is QAM in which two-dimensional M-QAM is configured in a multidimensional manner using a plurality of consecutive time slots,
the two-dimensional M-QAM is QAM in which signal points of signal symbols representing a bit sequence are assigned to a two-dimensional plane with an in-phase axis and a quadrature axis,
M is an even power of 2 and is equal to or greater than 64,
the constellation for the multidimensional QAM is part of a combination of a first constellation and a second constellation,
the first constellation is a constellation of the two-dimensional M-QAM, and
the second constellation is a constellation of following two-dimensional QAM.

$(\sqrt{M}-1)^2$–QAM (Supplementary Note 16)

A calculation apparatus including:
a memory configured to store an instruction (program code); and
at least one processor configured to execute the instruction, wherein
the at least one processor is configured to execute optimization processing of optimizing a mapping rule of a bit sequence to a multidimensional QAM signal in multidimensional QAM,
the multidimensional QAM is QAM in which two-dimensional N-QAM is configured in a multidimensional manner using a plurality of consecutive time slots,
the two-dimensional N-QAM is QAM in which signal points of signal symbols representing a bit sequence are assigned to a two-dimensional plane with an in-phase axis and a quadrature axis,
N is an odd power of 2 and is equal to or greater than 32,
the constellation for the multidimensional QAM is part of a combination of a first constellation and a second constellation,
the first constellation is a constellation of the two-dimensional N-QAM, and
the second constellation is a constellation of following two-dimensional QAM.

$\left(\sqrt{\frac{N}{2}}+1\right)^2$ – QAM (Supplementary Note 17)

The calculation apparatus according to supplementary note 15 or 16, wherein an evaluation function used in the optimization processing is a function including a Hamming distance and an error rate calculated based on a Euclidean distance.

What is claimed is:

1. A signal modulation apparatus comprising
a memory configured to store an instruction; and
at least one processor configured to execute the instruction to modulate an input signal into a multidimensional Quadrature Amplitude Modulation (QAM) signal using multidimensional QAM, wherein
the multidimensional QAM is a QAM in which a two-dimensional M-QAM is configured in a multidimensional manner using a plurality of consecutive time slots,
the two-dimensional M-QAM is a QAM in which signal points of signal symbols representing a bit sequence are assigned to a two-dimensional plane with an in-phase axis and a quadrature axis,
M is an even power of 2 and is equal to or greater than 64,
a constellation for the multidimensional QAM is part of a combination of a first constellation and a second constellation,
the first constellation is a constellation of the two-dimensional M-QAM, and
the second constellation is a constellation of the following two-dimensional QAM:

$(\sqrt{M}-1)^2$–QAM.

2. The signal modulation apparatus according to claim 1, wherein
in the constellation for the multidimensional QAM, a layout of the signal points is symmetric with respect to the in-phase axis and symmetric with respect to the quadrature axis.

3. The signal modulation apparatus according to claim 1, wherein
the multidimensional QAM signal is a signal selected from a plurality of candidate signals in ascending order of amplitude from a candidate signal having smallest amplitude, and
the plurality of candidate signals are signals obtained from the combination of the first constellation and the second constellation.

4. The signal modulation apparatus according to claim 1, wherein
in the constellation for the multidimensional QAM, a first part of the signal points of one constellation of the first constellation and the second constellation is present on the in-phase axis, and
a second part of the signal points of the one constellation is present on the quadrature axis.

5. The signal modulation apparatus according to claim 4, wherein
the at least one processor is configured to optimize occurrence probability of each of the signal points in the constellation for the multidimensional QAM in terms of amplitude of the multidimensional QAM signal by using an autoencoder.

6. A signal modulation apparatus comprising:
a memory configured to store an instruction; and
at least one processor configured to execute the instruction to modulate an input signal into a multidimensional Quadrature Amplitude Modulation (QAM) signal using multidimensional QAM, wherein the multidimensional QAM is a QAM in which a two-dimensional N-QAM is configured in a multidimensional manner using a plurality of consecutive time slots, the two-dimensional N-QAM is a QAM in which signal points of signal symbols representing a bit sequence are assigned to a two-dimensional plane with an in-phase axis and a quadrature axis, N is an odd power of 2 and is equal to or greater than 32, a constellation for the multidimensional QAM is part of a combination of a first constellation and a second constellation, the first constellation is a constellation of the two-dimensional N-QAM, and the second constellation is a constellation of the following two-dimensional QAM:

$$\left(\sqrt{\frac{N}{2}}+1\right)^2 - QAM$$

7. The signal modulation apparatus according to claim 6, wherein
in the constellation for the multidimensional QAM, a layout of the signal points is symmetric with respect to the in-phase axis and symmetric with respect to the quadrature axis.

8. The signal modulation apparatus according to claim 6, wherein
the multidimensional QAM signal is a signal selected from a plurality of candidate signals in ascending order of amplitude from a candidate signal having smallest amplitude, and
the plurality of candidate signals are signals obtained from the combination of the first constellation and the second constellation.

9. The signal modulation apparatus according to claim 6, wherein
in the constellation for the multidimensional QAM, a first part of the signal points of one constellation of the first constellation and the second constellation is present on the in-phase axis, and
a second part of the signal points of the one constellation is present on the quadrature axis.

10. The signal modulation apparatus according to claim 9, wherein
the at least one processor is configured to optimize occurrence probability of each of the signal points in the constellation for the multidimensional QAM in terms of amplitude of the multidimensional QAM signal by using an autoencoder.

11. A signal modulation method comprising:
modulating an input signal into a multidimensional Quadrature Amplitude Modulation (QAM) signal using multidimensional QAM; and
outputting the multidimensional QAM signal, wherein
the multidimensional QAM is a QAM in which a two-dimensional M-QAM is configured in a multidimensional manner using a plurality of consecutive time slots,
the two-dimensional M-QAM is a QAM in which signal points of signal symbols representing a bit sequence are assigned to a two-dimensional plane with an in-phase axis and a quadrature axis,
M is an even power of 2 and is equal to or greater than 64,
a constellation for the multidimensional QAM is part of a combination of a first constellation and a second constellation,
the first constellation is a constellation of the two-dimensional M-QAM, and
the second constellation is a constellation of the following two-dimensional QAM:

$(\sqrt{M}-1)^2$–QAM

* * * * *